(12) United States Patent
Raphaeli et al.

(10) Patent No.: US 6,671,311 B1
(45) Date of Patent: Dec. 30, 2003

(54) RECEIVER FOR USE IN A CODE SHIFT KEYING SPREAD SPECTRUM COMMUNICATIONS SYSTEM

(75) Inventors: Dan Raphaeli, Kfar Saba (IL); Avner Matmor, Omer (IL)

(73) Assignee: Itran Communications Ltd., Beersheva (IL)

( * ) Notice: Subject to any disclaimer, the term of this patent is extended or adjusted under 35 U.S.C. 154(b) by 0 days.

(21) Appl. No.: 09/551,449

(22) Filed: Apr. 18, 2000

Related U.S. Application Data

(63) Continuation-in-part of application No. 08/879,522, filed on Jun. 20, 1997, now Pat. No. 6,064,695.

(51) Int. Cl.[7] .......................... H04B 15/00; H04K 1/00; H04L 27/30
(52) U.S. Cl. ...................... 375/142; 375/130; 375/150
(58) Field of Search ................................ 375/130, 135, 375/136, 140, 142, 146, 147, 150, 219, 222, 343, 316, 295, 367, 133, 141; 370/203, 300, 335, 342, 441, 479, 282, 284

(56) References Cited

U.S. PATENT DOCUMENTS

| | | | | |
|---|---|---|---|---|
| 3,934,203 | A | 1/1976 | Schiff ........................... | 325/65 |
| 4,037,159 | A | 7/1977 | Martin ......................... | 325/30 |
| 4,477,912 | A | 10/1984 | Russell ........................... | 375/1 |
| 4,707,839 | A | * 11/1987 | Andren et al. .............. | 375/150 |
| 5,090,024 | A | 2/1992 | Vander Mey et al. ........... | 375/1 |
| 5,155,741 | A | 10/1992 | Waters et al. .................. | 375/1 |
| 5,179,572 | A | 1/1993 | Schilling ....................... | 375/1 |
| 5,204,877 | A | 4/1993 | Endo et al. | |

(List continued on next page.)

FOREIGN PATENT DOCUMENTS

| | | | | |
|---|---|---|---|---|
| EP | 0762664 | 3/1997 | ........... | H04B/1/707 |
| EP | 0910174 | 4/1999 | ........... | H04B/1/707 |
| WO | 98/59446 | 12/1998 | ........... | H04B/15/00 |

OTHER PUBLICATIONS

R. Link et al., "Design of a DSP-based Code-phase Shift Keying Modem for Wireless Local Area Network Applications" IEEE 1997, pp. 1069-1073.

Dan Raphaeli et al., U.S. patent appln. Ser. No. 09/448,880, filed Nov. 30, 1999, entitled "A Code Shift Keying Transmitter For Use In A Spread Spectrum Communications System".

Dan Raphaeli et al., U.S. patent appln. Ser. No. 09/415,723, filed Oct. 12, 1999, entitled "Apparatus For And Method Of Adaptive Synchronization In A Spread Spectrum Communications Receiver".

*Primary Examiner*—Jean B. Corrielus
(74) *Attorney, Agent, or Firm*—Howard Zaretsky

(57) ABSTRACT

A direct sequence spread spectrum receiver for use in a communication system that utilizes code shift keying (CSK) modulation. Code shift keying modulation transmits data in the form of circularly rotated spreading waveforms such as PN sequences. The data is conveyed in the amount of rotation applied to the spreading waveform before it is transmitted. While tracking, the receiver decodes the received symbols yielding the original transmitted data. The input frequency range of the receiver is divided into one or more frequency bands. For each frequency band, the received signal is filtered, digitized and split into I and Q data streams wherein the Q data stream is delayed by $\frac{1}{4}f_c$. Both I and Q data streams are sampled and correlated with an adaptive template. The received data is clocked into a shift register and circularly rotated and a correlation sum is generated. The correlation output of both I and Q channels are summed over all the frequency bands and a maximum correlations is determined. A shift index is chosen corresponding to the shift index yielding the maximum correlation sum. The templated in the receiver is dynamically adapted to the varying conditions of the channel. The template used by the correlator is continuously updated at each sample time using a template adaption function.

57 Claims, 12 Drawing Sheets

U.S. PATENT DOCUMENTS

| | | | |
|---|---|---|---|
| 5,237,587 A | 8/1993 | Schoolcraft | 375/1 |
| 5,263,046 A | 11/1993 | Vander Mey | 375/1 |
| 5,278,862 A | 1/1994 | Vander Mey | 375/1 |
| 5,359,625 A | 10/1994 | Vander Mey et al. | 375/1 |
| 5,574,748 A | 11/1996 | Vander Mey et al. | 375/204 |
| 5,748,671 A * | 5/1998 | Sutterlin et al. | 375/150 |
| 5,777,544 A | 7/1998 | Vander Mey et al. | 340/310.06 |
| 5,793,820 A | 8/1998 | Vander Mey | 375/350 |
| 5,937,003 A * | 8/1999 | Sutterlin et al. | 375/150 |
| 6,034,988 A | 3/2000 | Vander Mey et al. | 375/202 |
| 6,064,695 A | 5/2000 | Raphaeli | 375/230 |
| 6,108,368 A * | 8/2000 | Sutterlin et al. | 375/142 |
| 6,301,290 B1 * | 10/2001 | Sutterlin et al. | 375/150 |
| 6,473,450 B1 * | 10/2002 | Sutterlin et al. | 375/142 |
| 2002/0191679 A1 * | 12/2002 | Sutterlin et al. | 375/142 |

* cited by examiner 1 1 1 0 0 1 0 1
FIG. 3
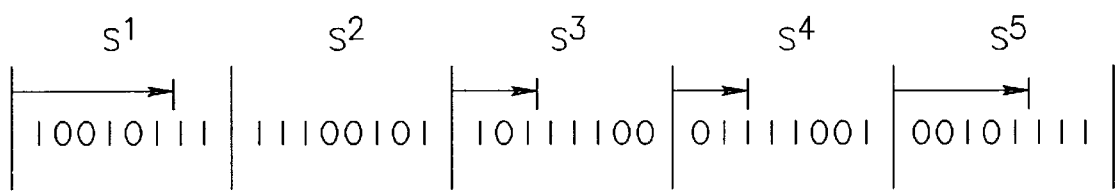
FIG. 4
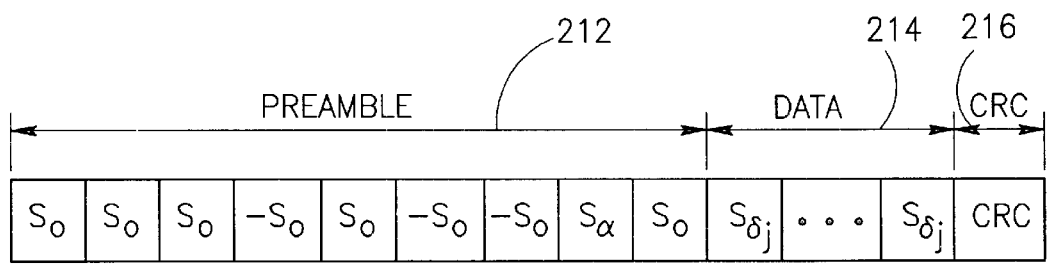
FIG. 5

RECEIVER FOR USE IN A CODE SHIFT KEYING SPREAD SPECTRUM COMMUNICATIONS SYSTEM

REFERENCE TO RELATED APPLICATIONS

This application is a continuation-in-part of U.S. application Ser. No. 08/879,522, filed on Jun. 20, 1997, now U.S. Pat. No. 6,064,695, entitled "Spread Spectrum Communication System Utilizing Differential Code Shift Keying."

FIELD OF THE INVENTION

The present invention relates generally to data communication systems and more particularly relates to a receiver for use in a code shift keying based direct sequence spread spectrum communication system.

BACKGROUND OF THE INVENTION

The use of spread spectrum communications techniques to improve the reliability and security of communications is well known and is becoming more and more common. Spread spectrum communications transmits data utilizing a spectrum bandwidth that is much greater than the bandwidth of the data to be transmitted. This provides for a more reliable communication in the presence of high narrowband noise, spectral distortion and pulse noise, in addition to other advantages. Spread spectrum communication systems typically utilize correlation techniques to identify an incoming received signal.

Spread spectrum communications systems are commonly used in military environments to overcome high energy narrowband enemy jamming. In commercial or home environments it may be used to achieve reliable communication on noise media such as the AC powerline. In particular, certain home electrical appliances and devices can potentially be very disruptive of communications signals placed onto the powerline. For example, electronic dimming devices can place large amounts of noise onto the powerline since these devices typically employ triacs or silicon controlled rectifiers (SCRs) to control the AC waveform in implementing the dimming function.

A communication medium such as the AC powerline may be corrupted by fast fading, unpredictable amplitude and phase distortion and additive noise. In addition, communication channels may be subjected to unpredictable time varying jamming and narrowband interference. In order to transmit digital data over such channels it is preferable to use as wide a bandwidth as possible for transmission of the data. This can be achieved using spread spectrum techniques.

One common type of spread spectrum communications, called direct sequence spread spectrum, is generated by first modulating the digital data and then multiplying the result with a signal having a particularly desirable spectral properties, such as a PN sequence. The PN sequence is a periodic sequence of bits having a particular period. Each bit in the sequence is termed a chip. The sequence has the property of having very low autocorrelation for delays larger than one chip. In some systems, the PN sequence is replaced by a chirp waveform. Several techniques are available for the transmitter to modulate the data signal, including biphase shift keying (BPSK) and continuous phase modulated (CPM) techniques. Minimum shift keying (MSK) is a known variation of CPM.

The spread spectrum receiver is required to perform synchronization that is commonly implemented using an acquisition method in combination with a tracking loop or other tracking mechanism. In a noisy unpredictable environment such as the AC powerline, the tracking loop typically fails frequently causing loss of information. Communication systems to overcome these problems are large, complex and expensive. In addition, these systems typically succeed at transmitting only one or more bits per symbol.

Receiving and demodulating signals that have been subject to PN modulation requires that the same PN code sequence be generated in the receiver and correlated with the received signal to extract the data modulation. One type of correlation technique employs a digital matched filter to compare the received digital signal with the locally generated version of the PN code. The digital filter produces an in phase (I) signal and a quadrature (Q) signal from which a digital demodulator such as a DPSK demodulator can derive data values. Another function of the digital matched filter is to produce correlation measurements from which synchronization signals can be generated.

In despreading a spread spectrum signal, the receiver produces a correlation pulse in response to the received spread spectrum signal when the received spread spectrum signal matches the chip sequence to a predetermined degree. Various techniques are available for correlating the received signal with the chip sequence, including those using surface acoustic wave (SAW) correlators, tapped delay line (TDL) correlators, serial correlators, and others.

Synchronization of signals between a transmitter and receiver that are communicating with each other in a spread spectrum communication system is an important aspect of the process of transmitting signals between them. Synchronization between transmitter and receiver is necessary to allow the despreading of the received signals by a spreading code that is synchronized between them so that the originally transmitted signal can be recovered from the received signal. Synchronization is achieved when the received signal is accurately timed in both its spreading code pattern position and its rate of chip generation with respect to the receiver's spreading code.

A common problem encountered in most types of communications systems, particularly spread spectrum communications systems, is the dynamic nature of the channel. In many cases, the characteristics of the channel are not constant and changes with time. Some prior art communications systems employ some form of training sequence at the beginning of the packet before data reception begins. As a result, the receiver is dynamically adjusted for conditions on the channel that exist at the time of the training sequence. Further adaptation to the channel, however, is not performed for the remainder of the packet. In some cases, the packet may have a relatively long duration. In this case, depending on the changes that occur to the channel during reception, the receiver may lose synchronization and from that point onward would not be able to correctly receive data.

Therefore, it would be desirable if the receiver were able to dynamically adapt itself to varying conditions of the channel in such a way that the accuracy of the receiver is maintained. Having the ability to track changes in the channel improves the performance and reliability of the receiver.

SUMMARY OF THE INVENTION

The present invention is a direct sequence spread spectrum receiver for use in a communication system that utilizes a modulation technique referred to as code shift keying (CSK). Use of CSK modulation increases the number of bits transmitted per symbol, decreases synchronization requirements and improves performance. Code shift keying modulation transmits data in the form of circularly rotated spreading waveforms. The spreading waveform may comprise any type of waveform that has suitable auto correlation properties such as a chirp or PN sequence. The receiver of the present invention may be constructed to use any type of spreading waveform including a chirp or PN sequence.

During each symbol period (referred to as a unit symbol time or UST), a plurality of bits are transmitted. The symbol period is divided into a plurality of shift indexes with each shift index representing a particular bit pattern. The waveform is rotated by an amount in accordance with the data to be transmitted. The data is conveyed in the amount of rotation applied to the chirp before it is transmitted. Alternatively, the data may be conveyed in the shift differential between consecutive symbols. In addition to the rotation applied to symbols, the phase of the rotated spreading waveform is used to convey an additional bit of information.

The receiver is adapted to receive the signal transmitted through the channel. The receiver operates in either the acquisition mode or the tracking mode. During acquisition, the receiver attempts to acquire synchronization of the signal. It searches for the presence of a preamble and once found tries to synchronize on a synchronization sequence sent by the transmitter. The synchronization sequence is used by the receiver to train the receiver to the conditions on the channel and optionally to generate the initial value for the template to be used during the tracking mode of operation. The training sequence used for synchronization may or may not be the same training sequence used to generate the initial value for the tracking template.

During tracking mode, the receiver decodes the received symbols yielding the original transmitted data. The input frequency range of the receiver is divided into one or more frequency bands. For each frequency band, the receive signal is filtered, digitized and split into I and Q data streams wherein the Q data stream is delayed by $\frac{1}{4}f_c$. Both I and Q data streams are sampled and correlated with an adaptive template.

Correlations is used to detect the amount of rotation in the symbol. The received data is clocked into a shift register and circularly rotated. For each rotation shift, the correlator generates a correlation sum. The correlation output of both I and Q channels are summed over all the frequency bands and input to a maximum correlation detector. A shift index is chosen during each UST corresponding to the shift index that yields the maximum correlation sum. This shift index represents the original rotation applied to the transmitted symbol. The shift index is then decoded to yield the received data.

A key feature of the present invention is the dynamic adaptation of the template to the varying conditions of the channel. The template used to correlate the received symbol is continuously updated at each sample time using a template adaption function. The function performs an averaging of the previous contents of the template with the received symbol.

The transmitter sends data in the form of packets to the receiver. A start of packet field is placed at the beginning of the packet. The receiver searches for a correlation peak over all the possible shifts of each symbol received using linear correlation. Once the start of packet field is detected the receiver searches for a known pattern from the transmitter. Synchronization is achieved when the pattern is received. Once synchronization is achieved, cyclic correlation is used to receive the remainder of the packet. The data sent by the transmitter is encoded in the rotations applied to each symbol.

The CSK communication system has the advantages of higher reliability of transmission, simple and fast synchronization and immediate recovery from severe fading. In addition, a plurality of bits can be sent per symbol, permitting either a longer time duration for each symbol or a higher data throughput rate using the same symbol time duration as in typical direct sequence spread spectrum communications systems. Another advantage of the system is that it provides robustness against channels characterized by frequency varying signal to noise ratios. Further, the present invention can be implemented at low cost as a VLSI integrated circuit or ASIC.

There is therefore provided in accordance with the present invention a receiver for use in a code shift keying spread spectrum communication system comprising a front end circuit coupled to a channel and adapted to filter a receive input signal into N frequency bands, the front end circuit operative to generate N receive sample streams, each receive sample stream associated with one of the frequency bands, N receiver circuits coupled to the front end circuit, each receiver circuit associated with a frequency band, each receiver circuit comprising a template comprising a plurality of taps, initialization means operative to generate an initial value for the template from a plurality of training symbols stripped of rotation and phase whereby the template is initialized to the channel, means for generating receive symbols from the receive sample stream, a correlator adapted to correlate the contents of the template with the received symbol, the correlator operative to generate a correlation sum for each relative rotation between the template and the received symbol, for all possible transmitted rotations of a symbol, a combiner for combining the correlation sums generated by the N receiver circuits so as to yield a total correlation value, a maximum correlator detector operative to determine a shift index corresponding to a maximum total correlation value over all rotations of the template, the shift index subsequently decoded to yield receive data and wherein N is a positive integer.

There is also provided in accordance with the present invention, in a code shift keying spread spectrum communications system, a method of receiving, the method comprising the steps of filtering an input signal received from a channel into N frequency bands and generating N receive sample streams therefrom, each receive sample stream associated with one of the frequency bands, for each frequency band providing a template comprising a plurality of taps, generating an initial value for the template from a first plurality of de-rotated and phase stripped training symbols thereby adapting the template to the channel, synchronizing a symbol clock in response to a second plurality of training symbols, generating receive symbols from the receive sample stream in accordance with the symbol clock, correlating the contents of the template with the received symbol so as to generate a correlation sum for each relative rotation between the template and the received symbol, for all possible transmitted rotations of a symbol, combining the N correlation sums so as to yield a total correlation sum, determining a shift index corresponding to a maximum total correlation sum over all rotations of the template, decoding the shift index to yield receive data and wherein N is a positive integer.

There is further provided in accordance with the present invention a code shift keying spread spectrum communication transceiver comprising a transmitter adapted to generate symbols for transmission over a channel, the symbols comprising a spreading waveform circularly shifted in accordance with the data to be conveyed by the symbol and a receiver comprising a front end circuit coupled to a channel and adapted to filter a receive input signal into N frequency bands, the front end circuit operative to generate N receive sample streams, each receive sample stream associated with one of the frequency bands, N receiver circuits coupled to the front end circuit, each receiver circuit associated with a frequency band, each receiver circuit comprising a template comprising a plurality of taps, acquisition means operative to generate an initial value for the template from a plurality of training symbols that have been stripped of rotation and phase whereby the template is adapted to the channel, means for generating receive symbols from the receive sample stream, a correlator adapted to correlate the contents of the template with the received symbol, the correlator operative to generate a correlation sum for each relative rotation between the template and the received symbol, for all possible transmitted rotations of a symbol, a combiner for combining the correlation sums generated by the N receiver circuits so as to yield a total correlation sum, a maximum correlator detector operative to determine a shift index corresponding to a maximum total correlation sum over all rotations of the template, the shift index subsequently decoded to yield receive data and wherein N is a positive integer.

BRIEF DESCRIPTION OF THE DRAWINGS

The invention is herein described, by way of example only, with reference to the accompanying drawings, wherein:

FIG. 3 is an illustration of a sample Pseudo Noise (PN) sequence suitable for use with the spread spectrum communications receiver of the present invention;

FIG. 4 is an illustration of a series of PN sequences, each of which was generated by rotating the sequence pattern of FIG. 3 by an amount in accordance with the data to be transmitted;

FIG. 5 is an illustration of the structure of the packet used in a communication protocol suitable for use with the receiver of the present invention wherein the preamble comprises a single non-zero rotated symbol;

DETAILED DESCRIPTION OF THE INVENTION

Notation Used Throughout

The following notation is used throughout this document.

| Term | Definition |
| --- | --- |
| AC | Alternating Current |
| BPF | Band Pass Filter |
| BPSK | Binary Phase Shift Keying |
| CMOS | Complementary Metal Oxide Semiconductor |
| CPM | Continuous Phase Modulation |
| CRC | Cyclic Redundancy Check |
| CSK | Code Shift Keying |
| DCSK | Differential Code Shift Keying |
| DPSK | Differential Phase Shift Keying |
| FIR | Finite Impulse Filter |
| LSB | Least Significant Bit |
| MSB | Most Significant Bit |
| MSK | Minimum Shift Keying |
| PN | Pseudo Noise |
| MPSK | M'ary Phase Shift Keying |
| ROM | Read Only Memory |
| SAW | Surface Acoustic Wave |
| SCR | Silicon Controlled Rectifier |
| SPI | Serial Peripheral Interface |
| SNR | Signal to Noise Ratio |
| SR | Shift Register |
| TDL | Tapped Delay Line |
| UST | Unit Symbol Time |

General Description

The present invention is a direct sequence spread spectrum receiver for use in a communication system that utilizes a modulation technique referred to as code shift keying (CSK). Use of CSK modulation increases the number of bits transmitted per symbol, decreases synchronization requirements and improves performance. Code shift keying modulation transmits data in the form of circularly rotated spreading waveforms. The spreading waveform may comprise any type of waveform that has suitable auto correlation properties such as a chirp or PN sequence. The receiver of the present invention may be constructed to use any type of spreading waveform including a chirp or PN sequence. The CSK data communications system of the present invention is applicable to numerous environments but is particularly applicable to relatively noisy environments such as the AC powerline.

Figure 1:
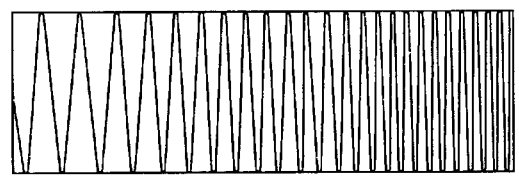
FIG. 1 an illustration of the chirp waveform suitable for use with the spread spectrum communications receiver of the present invention.

The spread spectrum system of the present invention transmits data in the form of circularly rotated spreading waveforms. The spreading waveforms may comprise any type of waveform that has suitable auto correlation properties such as a chirp or PN sequence. An illustration of an example chirp spreading waveform is shown in FIG. 1.

The spreading waveform shown spans a time duration that is termed a unit symbol time (UST). During each symbol period or UST, a plurality of bits are transmitted. The symbol period is divided into a plurality of shift indexes with each shift index representing a particular bit pattern. The spreading waveform is rotated by an amount in accordance with the data to be transmitted. The data is conveyed in the amount of rotation applied to the chirp before it is transmitted. Alternatively, the data may be conveyed in the shift differential between consecutive symbols. Typically, the chirp comprises a swept frequency signal. For example, the frequency sweep can span from 20 to 80 MHz or from 100 to 400 KHz. Or the chirp may comprise the swept frequency waveform shown in FIG. 1.

Figure 2:
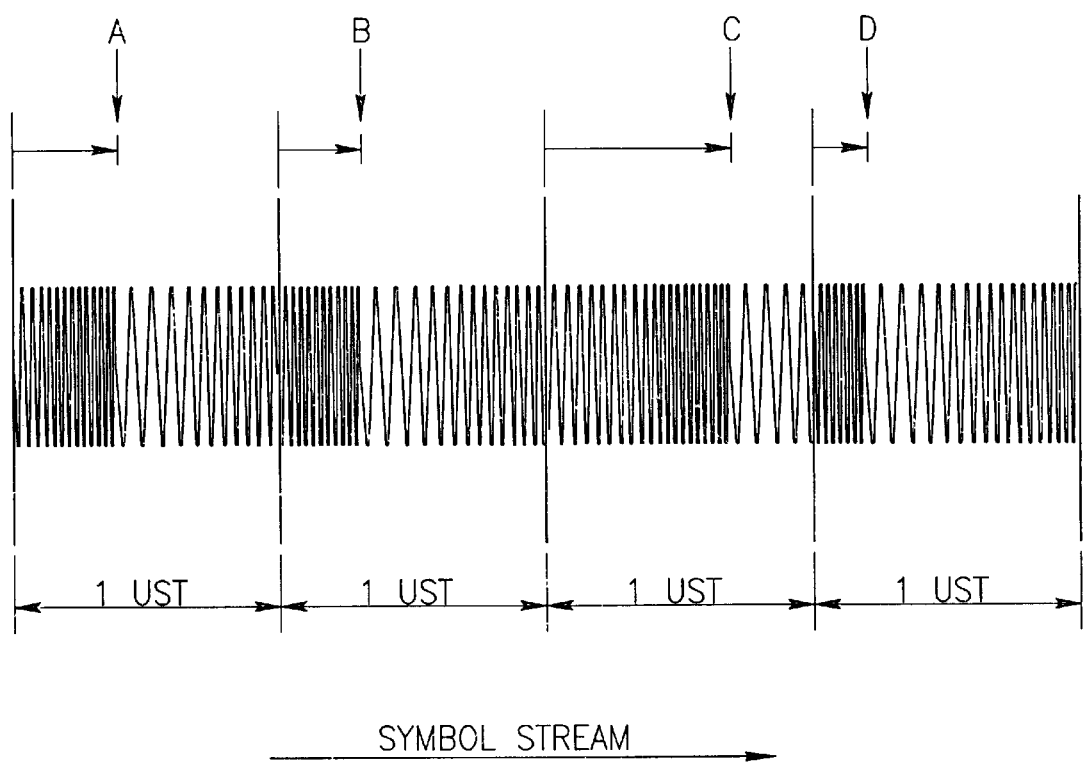
FIG. 2 is an illustration of a waveform of a sample symbol stream generated by rotating each chirp pattern by an amount representative of the data to be transmitted.

An illustration of a waveform of a symbol stream generated by rotating each chirp spreading pattern by an amount representative of the data to be transmitted is shown in FIG. 2. The DCSK modulation scheme of the present invention transmits data by rotating the chirp waveform a particular amount in accordance with the data to be transmitted. Thus, during each UST the chirp begins at a point in the chirp waveform that corresponds to the data to be transmitted during that particular UST. With reference to FIG. 2, four USTs are shown making up a sample symbol stream. The data to be transmitted within each UST is conveyed in the amount of rotation applied to each chirp waveform. During each UST, the chirp spreading waveform is rotated by a particular amount indicated by the length of the horizontal arrow before being transmitted. The vertical downwardly pointing arrow (labeled A, B, C, D corresponding to the first, second, third and fourth USTs, respectively) indicates the beginning of the original chirp waveform with no rotation applied. Within each UST the data that is to be transmitted determines the amount of rotation applied to the chirp before transmission.

The CSK communication system has the advantages of being robust to synchronization errors, relatively east to implement and yield performance close to that of the use of an error correcting code in the presence of white gaussian noise. In operation, each UST is divided into a predetermined number of shift indexes or shift locations. In the example provided herein, each UST is divided into 32 shift indexes. However, each UST can be divided into a number of shift indexes higher or lower than 32. Dividing each UST into 32 shift indexes translates to a transmission rate of five bits per symbol. A more detailed description of the CSK modulation technique can be found in U.S. appplication Ser. No. 08/879,522, filed on Jun. 20, 1997, now U.S. Pat. No. 6,064,695, entitled "Spread Spectrum Communication System Utilizing Differential Code Shift Keying," similarly assigned and incorporated herein by reference in its entirety.

The CSK transmitter transmits data in the form of packets to the receiver. Each packet is preceded by a preamble comprising a predetermined number of symbols. The length of the preamble can be any suitable number of symbols such that the receiver is able to synchronize with the transmitter. The operating environment as characterized by channel noise, level of interference, signal to noise ratio, transmit power and receiver performance may all play a factor in selecting the length of the preamble.

The transmitter generates circularly rotated sequences or alternatively, linear shifted binary sequences. The sequence can comprise any type of direct sequence that has suitable auto correlation properties such a chirp or PN sequence waveform. Preferably, a sequence is generated by filtering a binary sequence. An illustration of a sample binary PN sequence suitable for use with the communications system of the present invention is shown in FIG. 3. In this example an 8 bit PN sequence is shown. Note, however, that numerous different sequences can be used with the typical sequence being longer than 8 bits, e.g., 64 bits. The PN sequence is a sequence of bits having a certain time duration T. Each bit in the sequence is termed a chip.

The PN sequence is not a periodic sequence but comprises 64 bits having very low cyclic autocorrelation for delays longer than one chip. Note that such a sequence may be one period of a periodic PN sequence. Although a sequence of 64 bits is desirable, there is no maximal length shift register sequence of length 64. Therefore one of length 63 is taken and an additional '0' is appended to it. Adding the extra bit does effect the autocorrelation properties of the sequence but only slightly. Note that numerous other spreading sequences having adequate autocorrelation properties are also suitable for use with the present invention.

The direct sequence when represented in time, spans as certain duration that, as described previously, is termed a unit symbol time (UST). During each symbol time a plurality of bits of information are transmitted. The data is conveyed in the amount of rotation applied to the sequence before it is transmitted. For example, the frequency range of transmission may be 4 to 20 MHz.

An illustration of a sample symbol stream comprising a series of binary PN sequences each of which was generated by rotating the sequence pattern of FIG. 3 by an amount in accordance with the data to be transmitted is shown in FIG. 4. Thus, during each symbol period, the PN sequence begins to be transmitted at a point in the PN sequence that corresponds to the data to be transmitted during that particular period.

With reference to FIG. 4, five symbol periods are shown making up a sample symbol stream. For example, in the first period, i.e., $S^1$, the PN sequence is rotated by an amount 6 as indicated by the length of the horizontal arrow. The PN sequences labeled $S^1, S^2, S^3, S^4, S^5$ are rotated by an amount 6, 0, 3, 2, 5, respectively.

An illustration of the structure of the packet used in a communication protocol suitable for use with the receiver of the present invention wherein the preamble comprises a single non-zero rotated symbol is shown in FIG. 5. The structure of the packet, generally referenced 210, comprises a preamble 212, an L byte data field 214 and a Cyclic Redundancy Check (CRC) field 216. The preamble portion comprises a series of non rotated symbols denoted by $S_0$ followed by a symbol $S_\alpha$ shifted by a known predetermined amount $\alpha$, followed by zero or more non rotated symbols. For illustrative purposes, the transmitter scheme is described using a sequence of symbols in the preamble portion of the packet that comprises at least one symbol having a known non-zero shift.

Optionally, more than one symbol with a known non-zero shift may be transmitted in the preamble. The second symbol $S_\beta$ may have a predetermined shift of $\beta$. Alternatively, if only one symbol is transmitted with a known shift, i.e., $S_\alpha$ either a gap or a symbol with zero shift ($S_0$) may be inserted after the preamble but before transmission of the data symbols. The data symbols are denoted by $S_\delta$ where $\delta$ refers to the particular shift assigned to that symbol. Note that the preamble may have any number of zero shift and non-zero shift symbols.

In addition, the number of symbols transmitted in the preamble having a known non-zero shift may be larger or smaller than the examples described herein. Note that any arbitrary shifts can be used so long as each shift is different than the shift assigned to the $S_0$ symbol, e.g., zero shifts. For example, the non-zero rotated symbol $S_\alpha$ in FIG. 5 is rotated by $\alpha=46$ shift indexes. In the case of two non-zero rotated symbols $S_\alpha$, $S_\beta$, the rotation is equal to, for example, $\alpha=56$, $\beta=47$ shift indexes. Note that the non-zero shifts used in the preamble are totally arbitrary. Whatever shifts are used by the transmitter, however, must be known a priori by the receiver in order to properly detect the reception of a valid packet. Note also that the $S_0$ symbol sent in the preamble may have shifts other than zero shifts, as long as the shift is consistent throughout the preamble except for the non-zero rotated symbols, e.g., the $S_\alpha$, symbol.

In addition to rotation, the symbols in the preamble are also given a sign (i.e. phase). For example, if the preamble comprises seven unrotated symbols, the signs of the symbols may be: +, +, +, −, +, −, −. In another embodiment, the shifts assigned to the symbols in the preamble are given by: 0, 0, 0, 0, 0, 32, 32, 0 and the signs are given by −1, −1, +1, −1, +1, +1, +1, −1. The number 32 represents the shift position (or rotation) out of 64 possible shift positions, i.e., the symbol generated by starting from the middle of the spreading waveform.

Code Shift Keying Transmitter

In the CSK communication system, a preamble is sent before the data. The preamble functions as a training sequence whereby a template in the receiver is dynamically updated so as to 'learn' the channel response to the predetermined training sequence. For each packet, the preamble is used to adapt the receiver to the channel conditions.

Figure 6:
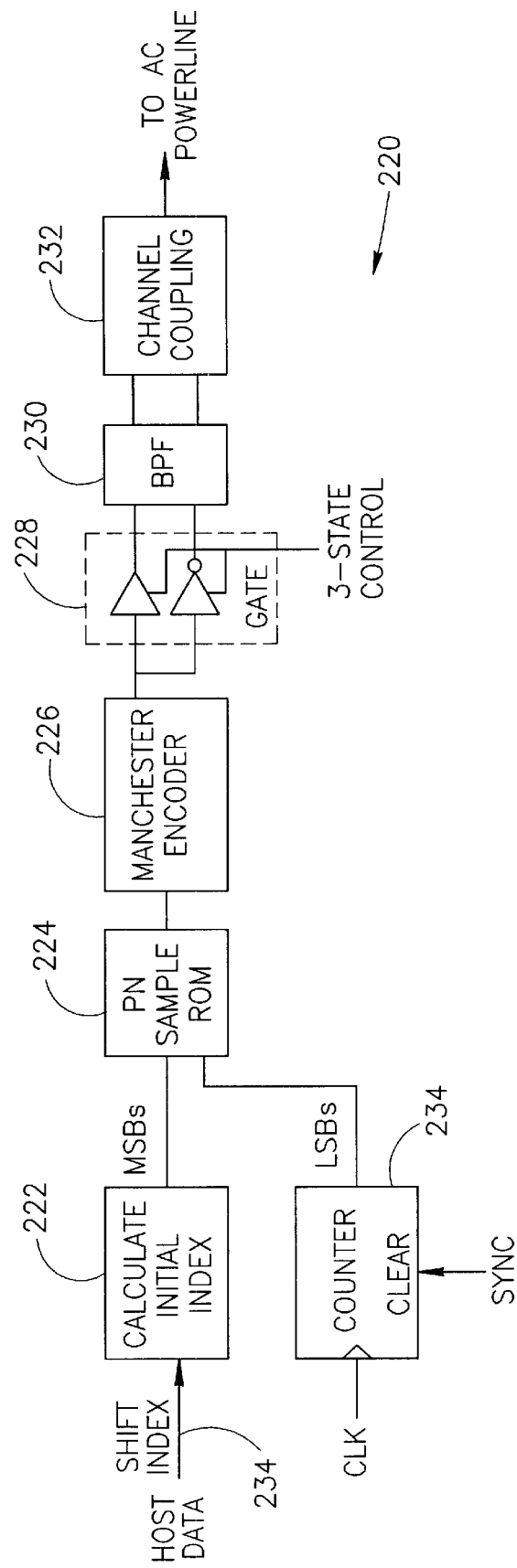
FIG. 6 is a block diagram illustrating an embodiment of a transmitter suitable for use with the receiver of the present invention wherein the output of the sample ROM is Manchester encoded.

A block diagram illustrating an embodiment of a transmitter suitable for use with the present invention wherein the output of the sample ROM is Manchester encoded is shown in FIG. 6. The transmitter, generally referenced 220, comprises an initial index calculation circuit 222, counter 234, PN sample ROM 224, Manchester encoder 226, gate 228, band pass filter (BPF) 230 and channel coupling circuitry 232. A more detailed description of a transmitter suitable for use with the receiver of the present invention can be found in U.S. application Ser. No. 09/449,880, filed on Nov. 30, 1999, entitled "A Code Shift Keying Transmitter For Use In A Spread Spectrum Communications System," similarly assigned and incorporated herein by reference in its entirety.

A preamble sequence having a length of N symbols is transmitted before data is sent over the channel. The symbols are indexed from j=0 through N−1. Each symbol in the sequence comprises T samples. For example, the PN sequence may be divided into T=64 shift indexes. In the data portion, each symbol is rotated circularly by the transmitter by a specific number of sample positions denoted by $\delta_j$, the rotation of each symbol is effective to convey $\log_2 64 = 6$ bits of information. In addition, to the rotation, the sign $d_j$ of the phase of the symbol is used to convey an additional bit. Thus, each symbol is used to transmit a total of 7 bits of information.

A host provides the data to be transmitted, including the header, i.e., preamble, data and CRC checksum sequence already generated. The host data to be transmitted is input to the initial index calculation circuit 222. The host data is used to determine the shift index that is between 0 and $2^n-1$, where n represents the number of bits transmitted per symbol (excluding the polarity bit). With 64 samples, the shift index is a number between 0 and $2^6-1=63$. Alternatively, the rate of transmission is halved but the bit rate is the same. In this case, each symbol comprises 128 samples whereby each symbol is shifted by a number between 0 and 127.

The initial index into the PN sequence is calculated by dividing the length of the PN sequence by the total number of symbols in the encoding set, e.g., $2^n$, and multiplying by the shift index as given below in Equation 1.

$$\text{initial\_index} = \left( \frac{PN\ sequence\ length}{number\ of\ possible\ shifts} \right) \cdot \text{shift\_index} \quad (1)$$

For example, consider a PN sequence length equal to 128 and the number of possible shifts equal to 64, i.e., the total number of possible symbols or shift indexes. Assuming the host data (i.e., the shift index) input to the calculation circuit 222 is 21 (may range from 0 to 63) then the initial index is equal to 42. In this case, the symbols are spaced apart from each other by 2 and are equal to 0, 2, 4 . . . 124, 126.

The output of the initial index calculation circuitry 222 forms the MSB portion of the address inputs to the PN sample ROM 224. In this example, multiple copies of the PN sequence are stored in a read only memory (ROM) device. The number of copies of the PN sequence is equal to the total number of symbols, e.g., 64. Each copy of the PN sequence is rotated by a different shift index. Thus, considering the example of a PN sequence length of 64 and 64 total symbols in the encoding set, then the PN sample ROM comprises 64 copies of the PN sequence whereby the first PN sequence is rotated by 0, the second by 1, and so on up to the $64^{th}$ sequence which is rotated by 63.

The LSBs of the PN sample ROM are formed form the output of a counter 234. The counter is adapted to count modulo the PN sequence length. The counter is clocked by a suitable clock source at the same rate bits are to be clocked out of the sample ROM. The counter is cleared every symbol period by a SYNC signal input to the clear input of the counter. The number of bits output of the counter depends on the length of the PN sequence. In the case of a 64 bit PN sequence length, 6 bits are output and in the case of 128 bit PN sequence length, 7 bits are output.

The bits output of the counter are input to the LSBs of the PN sample ROM forming the lower portion of the address. The upper portion of the address is the output of the initial index calculation circuitry 222 which functions to select one of the PN sequences stored in the ROM. The output of the counter cycles through the entire PN sequence for that symbol. The bits output from the PN sample ROM represent the PN sequence rotated in accordance with the shift index, i.e., the data input from the host. The required size of the PN sample ROM is thus given by the total number of symbols times the length of the PN sequence. For example, for 64 symbols and 64 bit sequence length, a PN sample ROM of size 4K×1 is required. For 64 symbols and 128 bit sequence length, a PN sample ROM of size 8K×1 ROM is required.

The output of the PN sample ROM is input to a Manchester encoder 226 which functions to encode the bits input thereto as either a Manchester '0' or '1' depending on the input. The Manchester encoder always creates a level shift with each bit being either a 0 to 1 shift or a 1 to 0 shift. Note that the Manchester encoder may be replaced by any other circuit or function block that is capable of providing the desired spectral characteristics. For example, a FIR filter may be used in place of the Manchester encoder. The Manchester encoder functions to convert the digital waveform, i.e., bit stream, into an analog waveform, also referred to as an encoded waveform.

Note also that the PN sample ROM and the Manchester encoder operate at a particular clock rate. In one embodiment of the invention the clock rate is 32 MHz. The clock rate may, however, be any other rate as long as the components of the transmitter are adapted to operate according to the clock rate.

The output of the Manchester encoders input to a logical gate 228 which comprises two gates: a non-inverting gate and inverting gate adapted to generate the complement of its input. The gates functions as output amplifiers generating the necessary drive currents required to drive the channel. Preferably, the gates operate at CMOS levels and are adapted to have a tri-state control which is asserted when the device is in receive mode and the transmitter is temporarily shut off. Use of the inverting gate functions to generate an inverted version of the output. This is useful when the subsequent stage requires a differential input signal. Alternatively, a single gate may be used, either inverting or non-inverting, with or without tri-state control. Preferably, the gate has tri-state control so as to be able to shut off the transmitter while receiving.

The differential output of the channel drive gates 228 is input to a band pass filter 230 which functions to generate the desired spectrum. The BPF 230 is an analog band pass filter preferably constructed as a symmetrical filter. The pass band of the filter is set so as to accommodate the frequency range in use, e.g., 4 to 20 MHz. Although asymmetrical (unidirectional) filters are easier to design and construct, a symmetrical filter is preferable in the case when the filter is used in the transmit path and the receive path.

The output of the BPF 230 is input to the channel coupling circuitry 232. The channel coupling circuitry functions to passively couple the analog signal output of the BPF to the channel. In this example, the channel comprises the AC power line. Alternatively, the channel may comprise other types of media such as optical fiber, twisted pair, RF, IR, etc. Once skilled in the electrical arts can modify the channel coupling circuitry so as to adapt the output signal to the desired channel medium.

Receiver Synchronization

During synchronization, a preamble comprising a sequence of symbols having known rotation and phase is transmitted to the receiver. The receiver attempts to match the received vectors in a predefined manner in order to determine whether signal or noise is being received. One synchronization is obtained at the beginning of the packet, tracking means is used to maintain synchronization for the remainder of the packet. A more detailed description of the synchronization scheme suitable for use with the receiver of the present invention can be found in U.S. application Ser. No. 09/415,723, filed on Oct. 12, 1999, entitled "Apparatus For And Method of Adaptive Synchronization In A Spread Spectrum Communications Receiver," similarly assigned and incorporated herein by reference in its entirety.

The receiver divides the received input vectors into two or more portions. The matching function is operative to match the multiple portions in some predefined manner to determine whether synchronization has been achieved. The result is the generation of a synchronization metric used to indicate the degree of synchronization achieved, i.e., an indication of how well the symbols received match the symbols expected in a valid preamble.

A synchronization acquisition apparatus and method functions to de-rotate, phase remove and match together the received symbols. Portions of the received symbols are used to form a template while other portions are de-rotated and correlated with the template. The template is not predefined but adaptive to the channel. The template is dynamically updated by 'learning' the channel response to a predetermined training sequence, i.e., the preamble. For each packet, the preamble is used to adapt the receiver to the channel conditions.

As describe previously, a preamble sequence having a length of N symbols is transmitted. The symbols $S_j$ are indexed from j=0 through N−1. Each symbol in the sequence has a length T samples after sampling at a certain sampling frequency. Note that the number of samples in the transmitter and in the receiver may not be equal, however they are both referenced as T in this description for clarity. In the examples presented herein T is equal to 64. Each symbol is rotated cyclically by the transmitter a specific number of sample positions denoted by $\lambda_j$. Thus, the rotation of each symbol is effective to convey 6 bits of information. In addition, to the rotation, the sign (or phase) $d_j$ of the symbol is used to convey an additional bit. Thus, each symbol can be used to transmit a total of 7 bits of information, if used to carry information instead of being used for synchronization. In general $d_j$ can be complex to represent phase rotation or scaling, if desired. The signal received by the receiver is termed X(n) and may comprise the complex samples of a single channel. The index 'i' is used to denote the first sample of the preamble sequence in X(n). In other words, 'i' is the position in the received signal stream that is currently being checked for synchronization. For each value of i, a synchronization match value is obtained.

Note that a receiver may comprise several channels, each channel occupying a different frequency band. Further, each channel may comprise separate I and Q streams (the I and Q represent the real and imaginary portions of the complex sample, respectively). If multiple channels are used in the receiver, a separate synchronization circuit, as shown in the example embodiments herein below, is used in each individual channel. Separate channels may be used to aid in combating interference in any one particular frequency band wherein each frequency has separate I and Q channels.

Recursive and non-recursive type synchronization circuits are presented herein. In both cases, the received input vectors are compared to each other according to some predefined matching function. The degree of matching indicates the degree of synchronization achieved, i.e., an indication of how well the symbols received have been detected as a valid preamble. The matching function may comprise, for example, taking the average of the non-rotated symbols and comparing them to the rotated symbols. Note that the input vectors may or may not correspond with the symbols transmitted by the transmitter since the symbols have passed through the channel and may be corrupted with noise. It is the role of the synchronization circuit to attempt to detect the signal from the surrounding noise.

The receiver is operative to divide the received signal into a plurality of vectors, each vector having the length of a symbol, i.e., a UST. Therefore, the following vectors described in Equation 2 below are obtained for the $j^{th}$ symbol.

$$S^{j,i} = \{X_{i+jT}, X_{i+jT}, X_{i+jT+1}, \ldots, X_{i+(j+1)T-1}\} \quad (2)$$

Note that there are NT samples in the preamble and j runs from 0 through N−1. At any time 'i' the received signal is divided into vectors, each vector indexed by j=0, 1, 2, etc. Each vector is then rotated by $-\lambda_j$ in order to de-rotate the received vector that was previously rotated by the transmitter with rotation $-\lambda_j$. Let us define a function $q(Z,\delta)$ that de-rotates a vector $Z$ by $\delta$. The de-rotation is performed in accordance with Equation 3 presented below.

$$q(Z,\delta)=\{Z_{-\delta+T}, Z_{-\delta+1+T}, \ldots, Z_{T-1}, Z_0, Z_1, \ldots, Z_{-\delta+T-1}\} \quad (3)$$

where q defines a function operation performed on the vectors

Z is an arbitrary vector formed from the received samples

T is the number of samples in a symbol at the receiver, e.g., 64

$\delta$ is the degree of shift or rotation applied to the vector

The rotated vector is then multiplied by its associated sign '$d_j$' to obtain the following vector as expressed in Equation 4 below.

$$B^{j,i}=q(S^{j,i}, \lambda_j) \cdot d_j \quad (4)$$

where j represents the index of the symbol in the training sequence;

i indicates the point in time when synchronization was declared;

B represents the vector rotated using Equation 3 above;

S represents the vector of received samples using Equation 2;

$\lambda$ represents the shift originally applied to the symbol by the transmitter;

d represents the sign (or phase) of the symbol; Note that if $d_j$ is not +1 or −1 than the function 'q' is divided by $d_j$ instead of being multiplying by $d_j$.

At this point, there are N vectors each represented by $B^{j,i}$ and associated with a single symbol comprising T samples.

The vectors are then matched together in a way that is defined by a particular function. For each vector, the function is operative to yield a result that is termed the synchronization output $\gamma_i$. The index i is incremented until a threshold is reached. Once the threshold is reached, a maximum result for $\gamma_i$ is obtained within the next symbol width of samples. Once the maximum is found, the packet is declared to be found and the shift index corresponding to the maximum is used to initialize the receiver timing. The receiver may wait an indeterminate length of time for synchronization to be achieved. The length of time required depends on many variables including the transmitter characteristics, channel characteristics, noise and receiver characteristics.

For the general non-recursive case, the synchronization is expressed mathematically in Equation 5 presented below.

$$\gamma_i = \sum_{k=0}^{T-1} f(B_k^{0,i}, B_k^{1,i}, \ldots, B_k^{N-1,i}) \quad (5)$$

The mathematical relation expressed in Equation 5 includes a matching function '$f$' which may be any general function, e.g., averaging, comparing, etc., that is used to determine the degree of match between the samples of the de-rotated vectors and thus whether the receiver is receiving an actual signal or just random noise. The terms 'B' represent the input vectors formed from the received signal. The vectors are used to search for synchronization and thus typically do not represent the symbols at the time synchronization initially begins. Note that the computation in Equation 5 is performed every sample time. It may, however, be performed fewer times in order to save complexity in the circuitry. In addition, each sample may comprise any number of bits.

For the general recursive case, the synchronization can be expressed mathematically in Equation 6 below.

$$\gamma_i = \sum_{k=0}^{T-1} g(Y_k^i, B_k^{0,i}, B_k^{-1,i}, \ldots, B_k^{-J_1,i}) \quad (6)$$

where $\gamma_i$ is the correlation output for the $i^{th}$ position;

k is a single element from vector B;

T is the number of samples in a received symbol, e.g., 64;

g() is a general function used for matching the template with other samples;

B represents a rotated vector;

$J_1$ is an nonnegative integer $Y_k^i$ is the output generated by the template adaptation function and is given by Equation 7 below $$Y_k^i = h(Y_k^{i-1}, B_k^{0,i}, B_k^{-1,i}, \ldots, B_k^{-J_2,1}) \quad (7)$$

where h() is a generalized function performed by the template adaptation function unit; and $J_2$ is an arbitrary non-negative integer.

The apparatus and method of the synchronization scheme will now be described in more detail. Two illustrative embodiments are presented including (1) a non-recursive embodiment that utilizes a set of template shift registers whose contents are derived from a sliding window comprising a number of shift registers equal to the number of non-rotated symbols in the preamble and (2) a recursive embodiment that utilizes an arbitrary number of template shift registers and a preamble comprising many symbols and a maximum of one non-zero rotation symbol $S_\lambda$. It is appreciated that other embodiments are possible, namely a recursive embodiment that utilizes an arbitrary number of template shift registers similar to the second embodiment, but uses a preamble comprising many symbols with a maximum of two non-zero rotation symbols $S_{\alpha 0} S_\beta$. In addition, a non-recursive embodiment operative to recognize a training preamble sequence without the use of a separate template register and correlator. Further, an embodiment that comprises multiple channels, each incorporating a separate synchronization circuit.

Acquisition: Sliding Window With N Shift Registers

Figure 7:
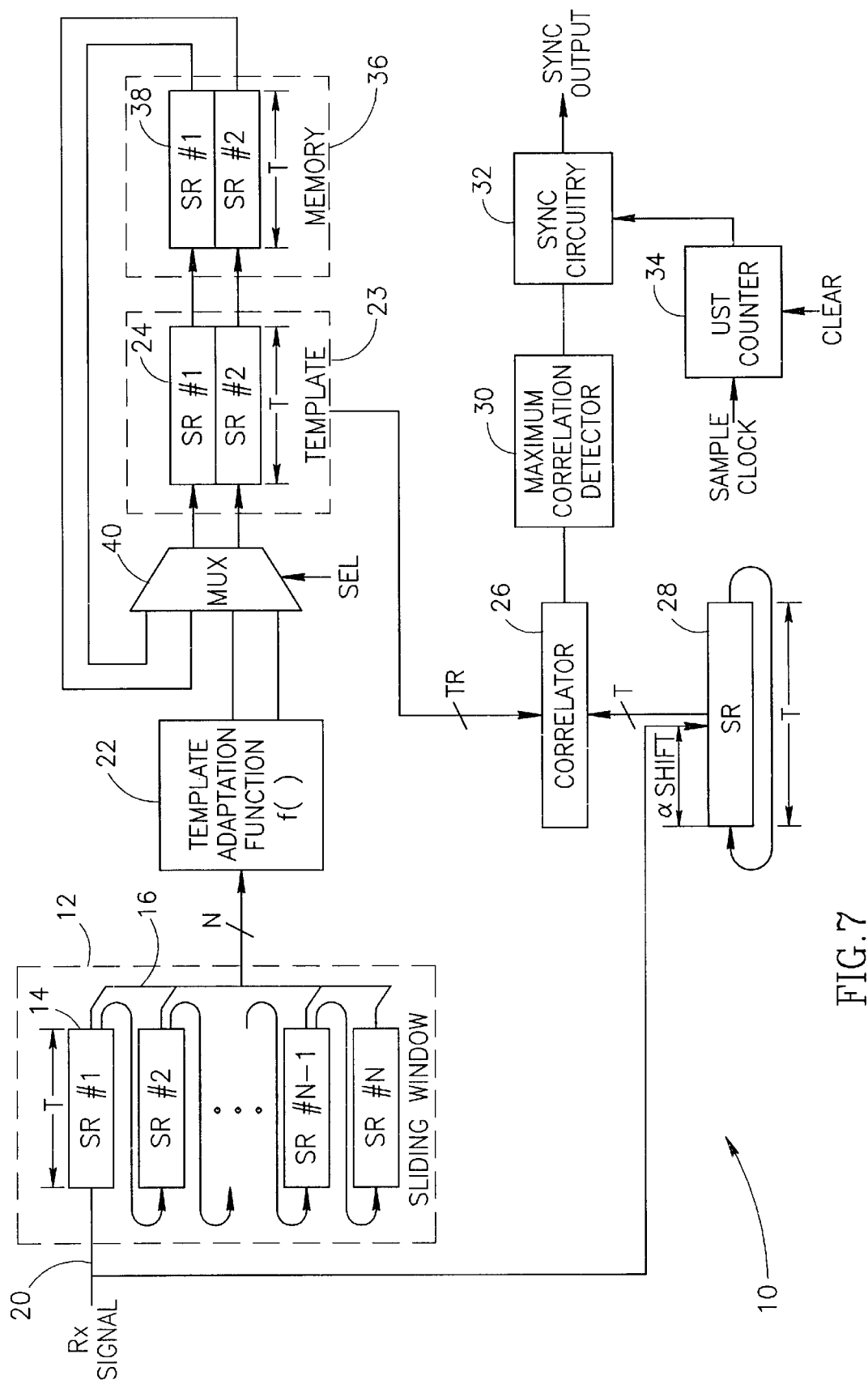
FIG. 7 is a block diagram illustrating an embodiment of a synchronization scheme suitable for use with the receiver of the present invention which utilizes a set of template shift registers whose contents are derived from a sliding window comprising a number of shift registers equal to the number of symbols N in the preamble.

A block diagram illustrating an embodiment of the synchronization system that utilizes a set of template shift registers whose contents are derived from a sliding window comprising a number of shift registers equal to the number of non-rotated symbols in the preamble is shown in FIG. 7. The synchronization circuitry, generally referenced 10, comprises a sliding window 12, template adaptation function 22, template shift registers 23, memory shift registers 36, multiplexer 40, correlator 26, shift register 28, maximum correlation detector 30, synchronization circuitry 32 and UST counter 34.

For illustration purposes, the length N of the training sequence, i.e., the preamble, may be 8 or 9 symbols. The first 7 symbols are transmitted with zero shift (rotation). The eighth symbol is assigned a shift of $\lambda_7=\alpha$ and an optional ninth symbol is assigned a shift of $\lambda_8=\beta$. Note that the sign $d_j$ of each symbol is determined in accordance with a short PN sequence, for example, that is not related to the symbol's PN sequence.

The template 23 comprises R shift registers 24, each shift register comprising T taps, e.g., T=64 taps. Note that the template 23 is shown comprising two shift registers 24 (R=2), labeled SR #1 and SR #2. The number R of shift registers, however, can be greater or less than two. The number R of shift registers effects the resolution of the correlation process. To obtain higher resolutions, larger values of R can be used.

The received signal 20 is derived from a sampler in the receiver that is placed after the A/D converter. In this example each I and Q sample comprises one bit. The received signal is input to a sliding window 12 which comprises a plurality of shift registers 14, labeled SR #1 through SR #N. In this embodiment, the number of shift registers is equal to the number N of symbols. In the example presented herein, the number of shift registers is equal to 7 that corresponds to the number of zero shift symbols transmitted in the preamble. The shift registers 14 are arranged such that the output of SR #1 wraps around to the input of SR #2 and so on through SR #N. The received signal is input to SR #1. The output of shift registers #1 through #N forms a bus 16 having N samples.

Each LSB of each shift register 14 is input to the template adaptation function 22 via the bus 16. Note that each shift register in the sliding window represents a UST delay. The UST delay of SR #1 functions to prevent the eighth symbol $S_\alpha$ from entering the template adaptation function 22. The template adaptation function 22 is operative to invert the samples according to $d_j$, sum the seven input bits and quantize the result so as to yield an average represented in two bits. Note that the template adaptation function can optionally be adapted to generate any number of output bits greater than or less than 2. In addition, the function performed on the input bits may be functions other than the average. Further, the sliding window may comprise a number of shift registers larger than or less than 7 and the input samples may comprise any number of bits.

To aid in understanding the principles of the present invention, the equivalent mathematical function $f$ will be shown in accordance with Equation 5.

$$f(B_k^{0,i},B_k^{1,i},\ldots,B_k^{7,i})=(B_k^{0,i},B_k^{1,i}+B_k^{2,i}+,B_k^{3,i}+B_k^{4,i}+B_k^{5,i}+B_k^{6,i})\cdot(B_k^{7,i}) \quad (8)$$

Where $B_k^{7,i}$ represents the rotated symbol ($S_\alpha$). The function $f$ is the same as that shown in Equation 5 above. For the case of a preamble having seven nonrotated symbols following by two rotated symbols ($S_\alpha$ and $S_\beta$), the function is expressed as follows in Equation 9 below.

$$f(B_k^{0,i},B_k^{1,i},\ldots,B_k^{8,i})=(B_k^{0,i}+B_k^{1,i}+B_k^{2,i}+B_k^{3,i}+B_k^{4,i}+B_k^{5,i}+B_k^{6,i})\cdot(B_k^{7,i}+B_k^{8,i}) \quad (9)$$

Where $B_k^{7,i}$ and $B_k^{8,i}$ represent the rotated symbols $S_\alpha$ and $S_\beta$, respectively.

The output of the template adaptation function 22 is input to shift registers 24, labeled SR #1 and SR #2, within template 23 via multiplexer 40. The multiplexer is adapted to couple either the two bits output of the memory 36 or the template adaptation function 22 to the input of the template. The multiplexer is controlled by a select line provided by a host control means. Note that alternatively, the template and memory may comprise a single shift register wherein each tap comprises two bits. Note that the template adaptation function may be adapted to output any number of bits wherein the number is independent of symbols M in the preamble.

The memory 36 comprises two shift registers 38, labeled SR #1, SR #2 that are used to store the template during the time that the maximum correlation detector 30 is verifying that the current correlation maximum is the maximum for the duration of a UST. After a period of one UST without finding a new maximum, the contents of the memory comprise the contents of the template exactly one UST previously. The contents of the memory can then be copied (i.e., shifted) back into the template by providing a suitable select line to the multiplexer 40 and providing a suitable clock to the memory shift registers.

The receive signal is also input to a shift register 28 in addition to the sliding window 12. The shift register 28 is configured as a circular shift register wherein the LSB is input fed back to the MSB in circular fashion. The input bits are input into the circular shift register at a tap point shifted by a from the first tap. The $\alpha$ shift is the shift assigned to the first non zero shifted symbol transmitted in the preamble. It is the symbol denoted by $S_\alpha$ and in this example is the eighth symbol in the preamble having a shift value of 46 out of 64.

The bits input to the shift register 28 are circularly shifted whereby the output bits wrap around to the input of the shift register. Note that in shifting the contents of the register, bits are not shifted past the input tap that is located $\alpha$ taps from the first tap, but thrown away. The eighth symbol contains the a shifted symbol.

For each sample, i.e., bit, position, the shift register 28 is correlated with the contents of the template shift register 23 (2 bits per tap in this example). Note that TR bits from the template and T bits from shift register 28 are input to the correlator where T is the number of samples per symbol, e.g., 64 and R is the number of bits per tap within the template 23, e.g., 2. The output of the correlator is input to a maximum correlation detector 30 that functions to determine the maximum value output of the correlator over a period of time. The correlator is used to generate an output every sample time. Note that in connection with the correlator, each R bits represent one signed integer.

The output of the maximum correlation detector is input to the synchronization circuitry 32. The synchronization circuitry 32 also receives the output of a UST counter 34. The UST counter is adapted to output a pulse after a UST time. It receives the sample clock as input in addition to a clear signal. The synchronization circuitry looks at the output of the maximum correlation detector and if a new maximum is detected, the UST counter 34 is cleared and the counter starts counting one UST time. Once a UST time has elapsed, a synchronization pulse is generated indicating that synchronization has been achieved. The result is a synchronization pulse generated exactly one UST from the detection of the last maximum. Note that the search for a maximum correlation is initiated only after a predefined threshold is exceeded.

Figure 8:
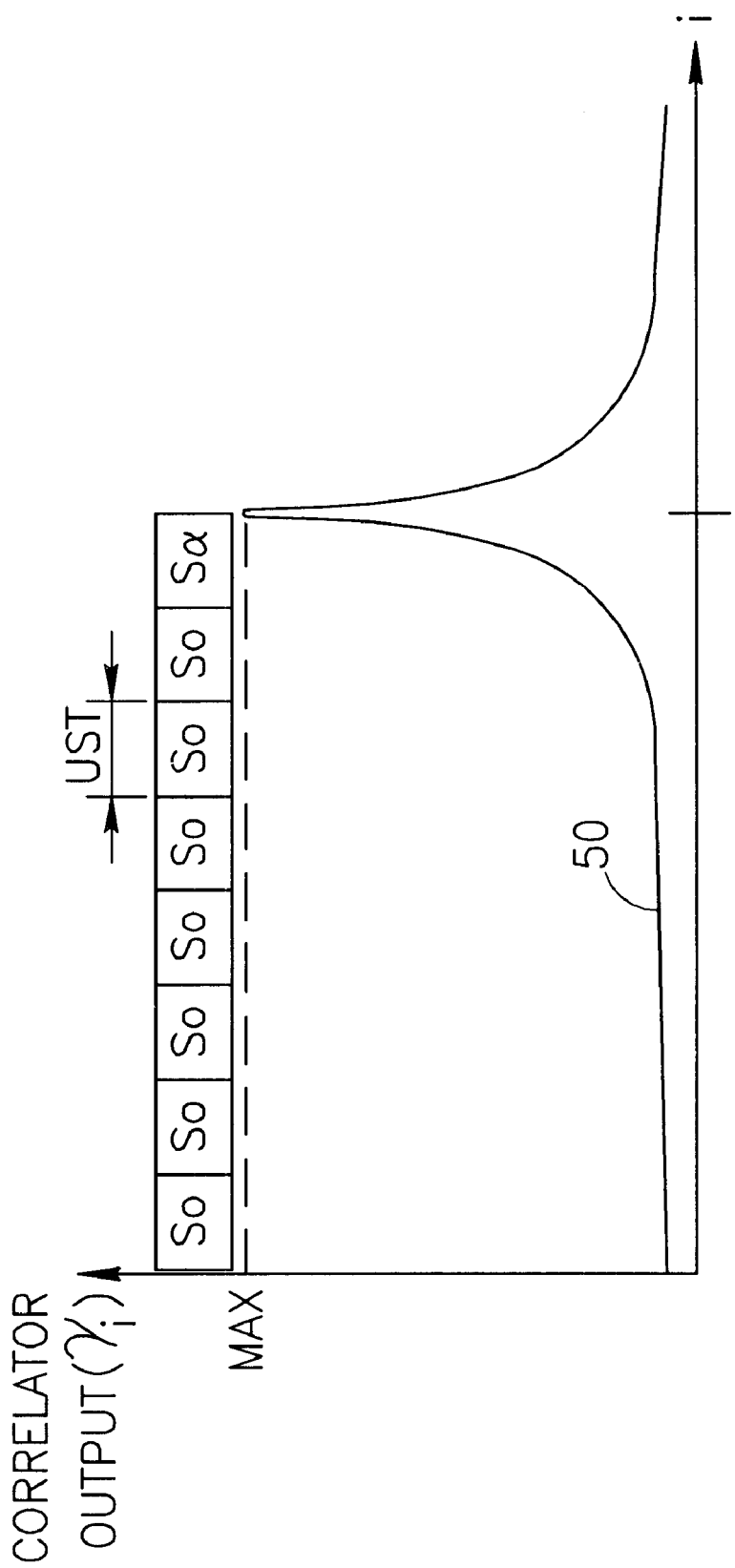
FIG. 8 is a graph illustrating the synchronization output signal as a result of correlation between the received signal and the contents of the template registers.

A graph illustrating the synchronization output signal as a result of correlation between the received signal and the contents of the template registers is shown in FIG. 8. The curve 50 indicates the expected correlation results obtained in response to receipt of a preamble. The seven consecutive nonrotated symbols are followed by a symbol rotated by $\alpha$. When the $\alpha$ symbol is input to the shift register 28, it is circularly shifted such that after a UST time delay, the symbol in the shift register 28 is a nonrotated symbol. This is because the shift given to the symbol when transmitted is compensated for by inputing the received input bits to the shift regsiter 28 at a point shifted by α taps from the first tap.

At this point, the template 23 comprises an average of the last seven symbols that are unrotated preamble symbols. The correlator, in response thereto, generates a peak correlation sum since both the shift register 28 and the template 23 both contain a nonrotated symbol and thus match. Note that the first seven nonrotated symbols do not generate a correlation peak since the received bits are input to the shift register 28 shifted by α from the first tap, thus causing a mismatch between them.

Once the synchronization acquisition phase is complete the receiver switches operation to tracking mode and data begins to be received. For a CSK receiver with an adaptive template, it is preferable to use the contents of the template generated during the synchronization acquisition phase during the data reception phase. This is achieved by providing the memory means to preserve the state of the template just before the α symbol $S_\alpha$, is received. The contents of the template to be preserved are those at the moment a maximum correlation is achieved, i.e., when the $S_\alpha$ symbol is completely inside shift register 28.

A key advantage of the present invention is that the template is not redefined for all conditions, but rather it is adaptive to the channel. The template is learned from the response of the channel to the training sequence sent in the preamble. This has the advantage that even in very noisy and/or distorting environments, i.e., channels, correct detection and decoding of the received data is still possible due to the fact that the template has been adapted to the channel. In this fashion, the template contains data that has been transmitted through the channel and incorporates any noise, impairments, etc. that are characteristic of the channel. The template thus differs from one channel to another and potentially from one packet to another. Thus, the invention is adapted to ignore the differences in channel noise levels and frequency responses among different channels and within the same channel at different times.

Note that the template is calculated by averaging the preamble symbols as output of the sliding window. Averaging the preamble symbols serves to greatly improve the SNR. Note, however, although the template function may comprise operations other than averaging, it is preferable that some form of averaging be performed on the template data. The sliding window may comprise less than the number of rotated symbols in the preamble, although this results in less efficient averaging. Taking a number greater than the number of non-rotated symbols, however, would likely result in added noise and other negative effects to the resulting average.

Note that in this first embodiment, the number of shift registers in the sliding window is dependent on the number of non-rotated symbols in the preamble. As the number of symbols in the preamble increases so does the number of shift registers required in the sliding window.

Synchronization Method

Figure 9:
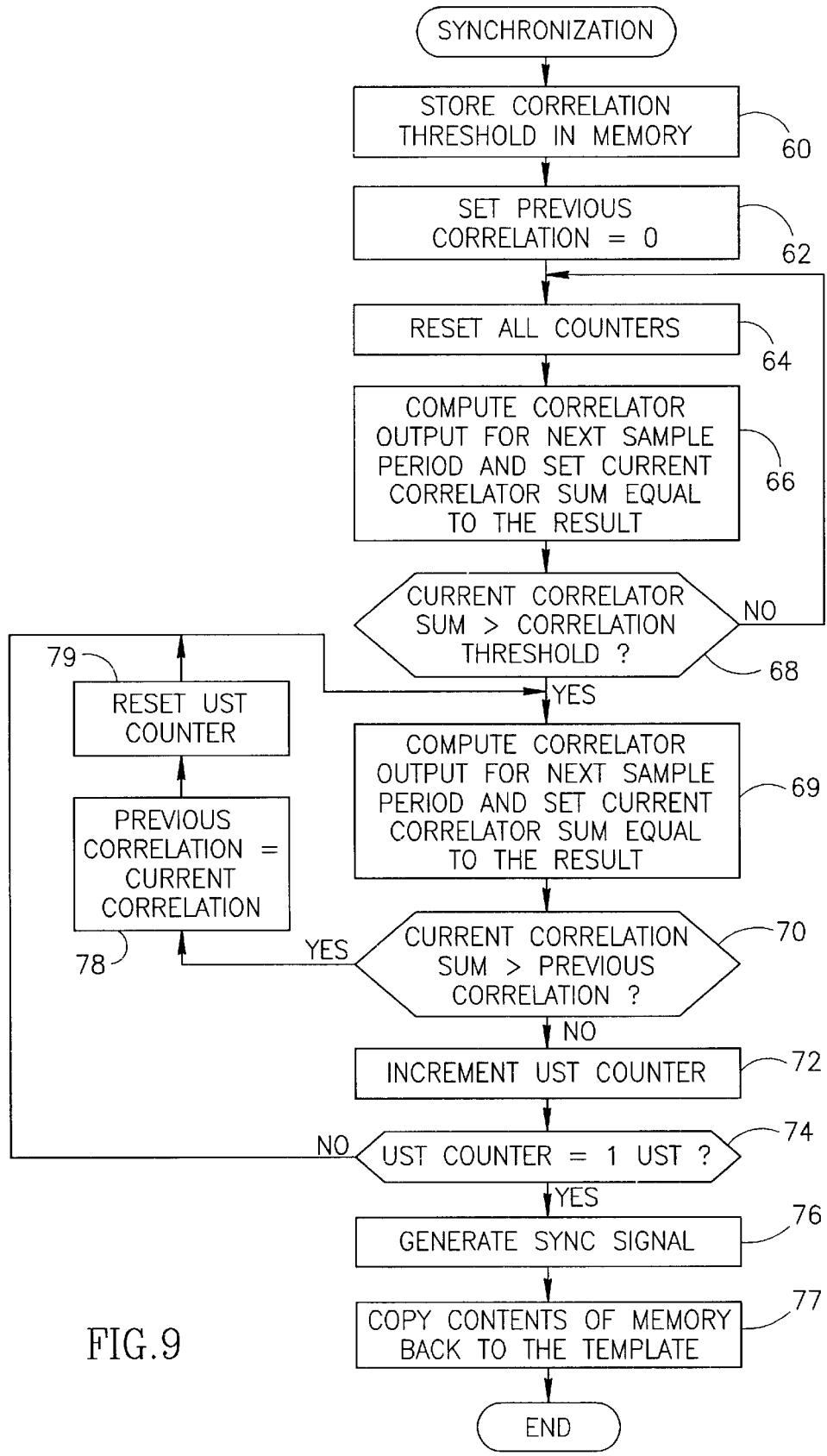
FIG. 9 is flow diagram illustrating the synchronization method suitable for use within the maximum correlation detector portion of the present invention.

The synchronization method will now be described in more detail. A flow diagram illustrating the synchronization method suitable for use with the receiver of the present invention is shown in FIG. 9. The synchronization method described herein is performed by the maximum correlation detector. The first step is to store the correlation threshold in memory (step 60). The correlation threshold is suitably set to prevent false determination of synchronization. The previous correlation is then initialized to zero (step 62). During operation, the previous correlation is a value normally stored in memory indicating a past correlation result. All internal counters are then reset (step 64).

The correlation sum output for the next sample period is computed and the current correlation sum is set equal to the resulting correlation sum (step 66). Note that one correlation output sum is computed per sample. The current correlator sum is compared to the correlation threshold (step 68). If it is smaller than or equal to the threshold, the method continues with step 64 and the counters are reset and another correlation output sum is computed.

Once the correlation sum exceeds the threshold, a loop is entered which determines the maximum correlation sum within the next UST symbol period. At the end of the UST period the previous correlation value holds the maximum sum found and a synchronization signal is generated. In particular, if the current correlation sum is greater than the correlation threshold, then the correlation sum output for the next sample period is computed and the current correlation sum is set equal to the resulting correlation sum (step 69). It is then determined whether the current correlation sum is greater than the previous correlation (step 70).

If it is, the previous correlation is set to value of the current correlation (step 78), i.e., a new peak (maximum) has been found. The UST counter is reset (step 79) and the method returns to step 69.

If the current correlation sum is not greater than the previous correlation, the UST counter is incremented (step 72). If the UST counter has not yet reached one UST time (step 74), the method continues with step 69. If it has reached one UST time, a synchronization signal is generated to indicate that synchronization has been achieved (step 76). This point in time corresponds to one UST after the peak.

The contents of the memory 36 are then copied back to the template 23 (step 77). As described hereinabove, following detection of a synchronization sequence, the memory 36 holds the value of the template at the time of the sync. The contents of the memory represent the optimal value for the template and serve as the initial value for the template during the tracking mode. Therefore, the memory contents must be copied back into the template 23. Note that this embodiment describes the case whereby the same N symbols used for synchronization are also used for (1) template initialization and (2) a method of synchronization that uses a template and a correlator.

In the case where a technique other than that described herein is used for synchronization or if the template is not to be stored, the template may be generated by averaging delayed symbols of the initialization sequence. This can be realized, for example, by connecting the template adaptation function block, e.g., block 22 (FIG. 7), to the shift registers in such a way as to compensate for the delay from the beginning of the last symbol to the point synchronization is declared. In this alternative embodiment, the template does not begin to fill until after synchronization has been declared.

Acquisition: Template With Arbitrary Number of Shift Registers

In this embodiment, the template comprises an arbitrary number of shift registers unrelated to the number of symbols M in the preamble. This embodiment utilizes feedback and the autoregressive method to achieve synchronization with the transmitter.

Figure 10:
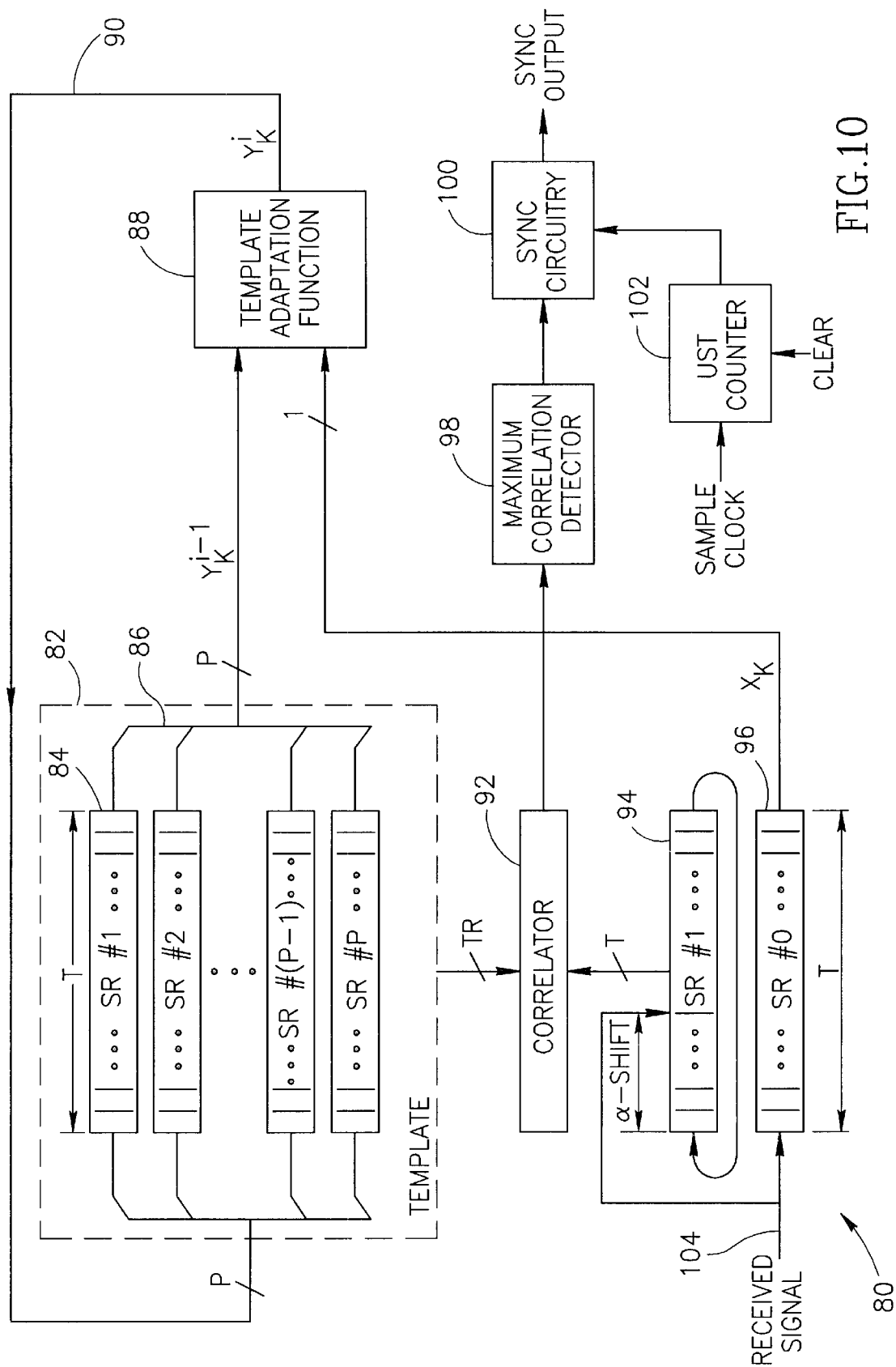
FIG. 10 is a lock diagram illustrating another embodiment of a synchronization scheme suitable for use with the present invention wherein the number of template shift registers is independent of the number of symbols transmitted in the preamble.

A block diagram illustrating an embodiment of the synchronization scheme suitable for use with the receiver of the present invention wherein the number of template shift registers is independent of the number of symbols transmitted in the preamble is shown in FIG. 10. The synchronization apparatus, generally referenced 80, comprises a template 82, template adaptation function 88, correlator 92, shift registers 94, 96, maximum correlation detector 98, synchronization circuitry 100 and UST counter 102.

Equations 8 and 9 can be modified in accordance with the specific embodiment disclosed herein. Thus, for this embodiment, the synchronization can be expressed mathematically in Equation 10 below.

$$\gamma_i = \sum_{k=0}^{T-1} Y_k^i \cdot B_k^i \tag{10}$$

where

T is the number of samples in a symbol, e.g., 64;

$B_k^i$ represents a rotated vector;

$Y_k^i$ is the output generated by the template adaptation function and is given by Equation 11 below $$Y_k^i = \begin{cases} Y_k^{i-1} \cdot c_1 = X_k \cdot c_2, & \text{for } k = i \bmod T \\ Y_k^{i-1}, & \text{for } k \neq i \bmod T \end{cases} \tag{11}$$

where $c_1$ and $c_2$ are coefficients;

$X_k$ is the output of the shift register 96 that forms one input to the template adaptation function;

The mathematical relation expressed in Equation 11 indicates that only one sample of the template is updated for each upcoming update bit. The samples remaining in the template at that point in time remain unchanged. Note that $c_1$ is preferably chosen such that $c_1$ is close to one. The result of the calculation in Equation 11 may optionally be limited in order to maintain the values within a specified range. Note also that when using the implementation of the second embodiment as expressed in Equations 10 and 11, the signs of all preamble symbols must be identical.

With reference to FIG. 10 the template 82 comprises a plurality of shift registers 84, labeled SR #1 through SR #P, with P representing an arbitrary number unrelated to the number of symbols M in the preamble The width, i.e., number of taps, of each shift register is T, the number of samples in a symbol e.g., 64. The value of P does influence the resolution of the system. Thus, to achieve higher resolutions, larger values of P should be used. The single bit outputs of the P shift registers 84 form a bus 86 that makes up the input denoted $Y_k^{i-1}$ to the template adaptation function 88.

Note that the initial value of the contents of the template shift registers is a don't care. Optionally, during the power up sequence, the template shift registers can be clocked T (i.e., 64) times to obtain an initial condition. The data clocked in corresponds to the signal received from the channel.

Alternatively, the shift registers 84 may comprise a single shift register having T taps corresponding to the length of the symbol and wherein each tap comprises P bits to improve the resolution of the synchronization process. In the example presented herein, T is equal to 64 and P is equal to 5. The value of 5 for P represents a compromise between the size of the template and the resolution desired form the synchronization process.

The received signal 104 is input to SR #0 96 that has a length T. The output of SR #0, denoted by $X_k$, forms one of the two inputs to the template adaptation function 88. The template adaptation function 88 is operative to calculate an output in accordance with the function expressed in Equation 10 above. The P bits output from the template form the other input to the function 88. The P bit output $Y_k^1$ 90 of the template adaptation function 88 is fed back to the input of the template 82 where it is clocked into the shift registers 84.

In this fashion, the contents of the template 82 are updated so as to track the channel characteristics. The function performed by the template adaptation function is operative to improve the SNR since the channel is learned over a period of time equal to the seven non rotated symbols transmitted during the preamble.

The received signal 104 input to SR #1 94 in addition to shift register #0. The length of SR #1 is also equal to T. The signal, however, is input to SR #1 at a tap that is shifted a distance of α taps with reference to the first tap, in similar fashion to the signal input to shift register 28 (FIGS. 2A and 2B). The output of shift register #1 94 is fed back to its serial input. Note that similar to shift register 28 (FIG. 7), the bits shifted in SR #1 94 are not shifted past the a tap position.

The T wide contents of SR #1 are input to the correlator 92 in parallel. The other input to the correlator is the parallel output of the template 82. To improve resolution, an arbitrary number R of bits from each tap of the template can be input to the correlator. To reduce complexity, however, a number R of bits smaller than P from each tap is input to the correlator. In the example presented herein, R is equal to 2 that represents a compromise between correlator complexity and desired resolution.

The correlator functions to correlate, i.e., perform a matched filtering operation, the TR bits of the template and the T bits from the SR #1 94. A correlation result is calculated once for each sample period. The output of the correlator is input to the maximum correlation detector 98 that functions to determine the maximum value output of the correlator over a period of time. The correlator is adapted to generate an output every sample time.

The output of the maximum correlation detector 98 is input to the synchronization circuitry 100. The synchronization circuitry 100 also receives the output of a UST counter 102. The UST counter is adapted to output a pulse every UST. It receives the sample clock as input in addition to a clear signal. In accordance with the output of the UST counter, the synchronization circuitry only looks at the output of the maximum correlation detector in accordance with the synchronization algorithm described hereinabove.

The graph in FIG. 8, described hereinabove, illustrates the synchronization output signal as a result of correlation between the received signal and the contents of the template registers. The curve 50 indicates the expected correlation results obtained in response to receipt of a preamble.

No correlation peak is generated from the seven non-rotated symbols since the received signal is clocked into SR #1 94 at a tap position that compensates for the α shift given to the symbol at the transmitter. When the α symbol $S_\alpha$ arrives, however, a correlation peak is generated.

In the preamble, seven consecutive non-rotated symbols are followed by a symbol rotated by α. When the α symbol is input to SR #1 94, it is circularly shifted such that after a UST time delay, the symbol in SR #1 94 is a non-rotated symbol. This is because the shift given to the symbol when transmitted is compensated for by inputting the received input bits to the shift regsiter at a point shift by α taps from the first tap.

At this point, the contents of the template 82 have been adapted to the channel for the previous seven unrotated symbol periods. The correlator, in response thereto, generates a peak correlation sum since SR #1 94 and the contents of the template 82 both contain a non-rotated symbol and thus match. Note that the first seven non-rotated symbols do not generate a correlation peak since the received bits are input to SR #1 94 shift by α from the first tap, thus causing a mismatch between them.

Once the synchronization acquisition phase is complete, data can begin to be received. Note that in operation it is preferable to use the contents of the template generated during the synchronization acquisition phase during the data reception phase for one of the inputs to the correlator. This can be achieved by providing means to store the results of the template just after the α symbol $S_\alpha$ is received. The template is optimal after the α symbol $S_\alpha$ is received. A maximal peak is generated at the moment the template is correlated with the α symbol $S_\alpha$. The contents of the template are preserved after the reception of the $S_\alpha$ symbol.

Template Learning

A key advantage of the present invention is that the template is not predefined for all conditions, but rather it is adaptive to the channel. The template is learned from the channel's response to the training sequence sent in the preamble. This has the advantage that even in very noisy environments, i.e., noisy channels, correct detection and decoding of the received data is still possible due to the fact that the template has been adapted to the channel. In this fashion, the template contains data that has been transmitted through the channel and incorporates any impairment that is characteristic of the channel. The template thus differs from one channel to another potentially from one packet to another. Thus, the invention is adapted to sense the differences in channel noise levels and frequency responses among different channels and within the same channel at different times.

As described hereinabove, the spread spectrum system of the present invention conveys information in the amount of rotation applied to a spreading waveform before it is transmitted. The spreading waveform may comprise any type of waveform having suitable autocorrelation properties. Preferably, the spreading waveform comprises a chirp waveform (FIG. 1) or a PN sequence (FIG. 3). The spreading waveform spans a UST time duration. During each symbol, a plurality of bits is transmitted. The symbol is divided into a plurality of shift indexes with each shift index representing a particular bit pattern. The spreading waveform is rotated by an amount in accordance with the data to be transmitted. Alternatively, the data may be conveyed in the shift differential between consecutive symbols.

The transmission and reception of the symbols may be represented mathematically as follows. Let $v_k$, k=0 to T−1 be a sequence of samples representing one symbol, where T is the number of samples in the transmitted symbol. The CSK symbols are rotated in accordance with the data to be transmitted, as described above. At the receiver, let $r_i$, i=0 to T−1 be the received samples representing one symbol, where T is the number of samples per symbol generated in the receiver. Let $t_i$, i=0 to T−1 represent the contents of the template. The template $t_i$ is $v_i$ as received through the channel and processed by the synchronization circuitry (shown in FIGS. 7 and 10) to remove any rotation and to average out the noise.

The receiver rotates $r_i$ through all possible rotations that the transmitter could have applied to the symbol. For each rotation, the receiver symbol $r_i$ is correlated with the template $t_i$, and the rotation yielding the best match (i.e., the maximum correlation sum) is chosen and decoded to produce the received data. Note that the correlation may comprise any matching function. Preferably, the correlation function is as given below in Equation 12.

$$Y = \sum_{i=0}^{T-1} w_i \cdot t_i \qquad (12)$$

where $w_i$ represents the rotated version of $r_i$. The result of the correlation has magnitude and phase. For purposes of selecting the most likely rotation of the received symbol, the phase is ignored. Once the rotation is found, however, the phase of the correlation yields an additional bit of information. Note that in the complex case, the correlation function is given by $$Y = \sum_{i=0}^{T-1} w_i \cdot t_i^* \qquad (13)$$

where $t_i^*$ denotes the complex conjugate of $t_i$. In the complex case, the phase may yield more than one bit of information by the use of MPSK modulation.

In accordance with the present invention, the contents of the template are not predetermined and fixed throughout reception of a packet. The initial value of the template is computed by averaging the symbols contained in the initialization sequence (i.e., training or synchronization sequence). The symbols averaged in this example are non-rotated symbols wit different phase. Other embodiments may included rotated symbols with different phases. Therefore, if the symbols of the initialization sequence were rotated and phase shifted from the original $v_i$, then they must be de-rotated and reverse phase shifted before averaging is performed.

During the tracking mode the received symbols are continuously averaged with the template. This dynamic averaging is performed so that the receiver can track the changes in the channel, improving the accuracy of the template and, consequently, the reception of the data. Note that the symbols received are first de-rotated and reverse phase shifted by an amount equal to the rotation and phase shift applied to the symbol at the transmitter, respectively, before being averaged with the template.

In addition, the template is multiplied with a memory factor before each received symbol is summed so as to enable adaptation to variations in the channel during the reception of a packet. Preferably, the memory factor is a number close to but less then one. The same effect can also be achieved by passing the samples of the de-rotated and reverse phase shifted received symbols through T low pass filters. Mathematically, the operation is described by Equation 14 below.

$$t_k^i = h(t_k^{i-1}, u_k^n, u_k^{n-1}, \ldots, u_k^{n-J}) \qquad (14)$$

where $u_k^n$ is the $k^{th}$ term of the $n^{th}$ symbol (the $n^{th}$ symbol is the last decoded symbol), de-rotated and reverse phase shifted;

i is the time index; and

J is an nonnegative integer.

The information related to the amount of de-rotation to apply to the symbols is obtained by decision feedback, i.e., first the symbol is detected, second the data is decoded from the rotation and phase determined, followed by application of the rotation and phase inversion determined to that symbol before averaging it with the template.

The process of averaging a number of received symbols in order to generate the template used for correlation can be expressed mathematically as follows.

$$t_i = \sum_{j=0}^{N-1} S_i^j \qquad (15)$$

where $h_i$ is the $i^{th}$ sample of the template, $S_i^j$ is the $i^{th}$ sample of the $j^{th}$ symbol in the initialization sequence after removing any rotation and phase, and N is the number of symbols in the initialization sequence.

The process of averaging the initialization symbols to generate the template has several advantages. The template is not predetermined but rather is adapted to the channel. This provides the receiver with the capability to receive and decode the symbols even over very noisy channels. In addition, averaging the symbols greatly improves the signal to noise ration (SNR) of the receiver compared to using one symbol as the reference. In the event the channel is time variant, continual adaptation of the template provides the correlator with a more accurate template.

In accordance with the present invention, the receiver is adapted to operate in one of two modes: acquisition and tracking. During acquisition both the channel is learned and synchronization is achieved. The receiver is operative to dynamically adjust the contents of the template in accordance with the channel. In synchronizing to the received symbols, the receiver determines the demarcation or framing of symbols. During tracking mode, the receiver receives and decodes symbols and continually updates the template in accordance with the received symbols.

It is important to note that the two modes are independent of one another. The acquisition mode may be used in numerous types of receivers and is not limited for use with the receiver described herein. Similarly, the receiver of the present invention may utilize an acquisition means other than that described herein.

During learning, a training sequence of symbols is transmitted. The training sequence may contain any suitable sequence of symbols that is known to the receiver. The sequence may contain non-shifted symbols but preferably contains symbols having pseudo-random shifts. The sequence is received at the receiver and averaged to yield a template representing the current conditions of the channel.

As described hereinabove, during synchronization the template is recalculated for each sample. Correlation is applied on a single symbol or a number of symbols using the template. Before correlation is performed, the symbols are de-rotated in accordance with the rotation applied at the transmitter. Each correlation result is compared to a predefined threshold. A correlation peak indicates the point of synchronization. The receiver then tracks the data using the synchronization thus obtained throughout the duration of the packet.

It is important to point out that the synchronization and template learning functions are not necessarily performed by the same circuit. The template learned during synchronization may or may not subsequently be used for receiving data.

Figure 11:
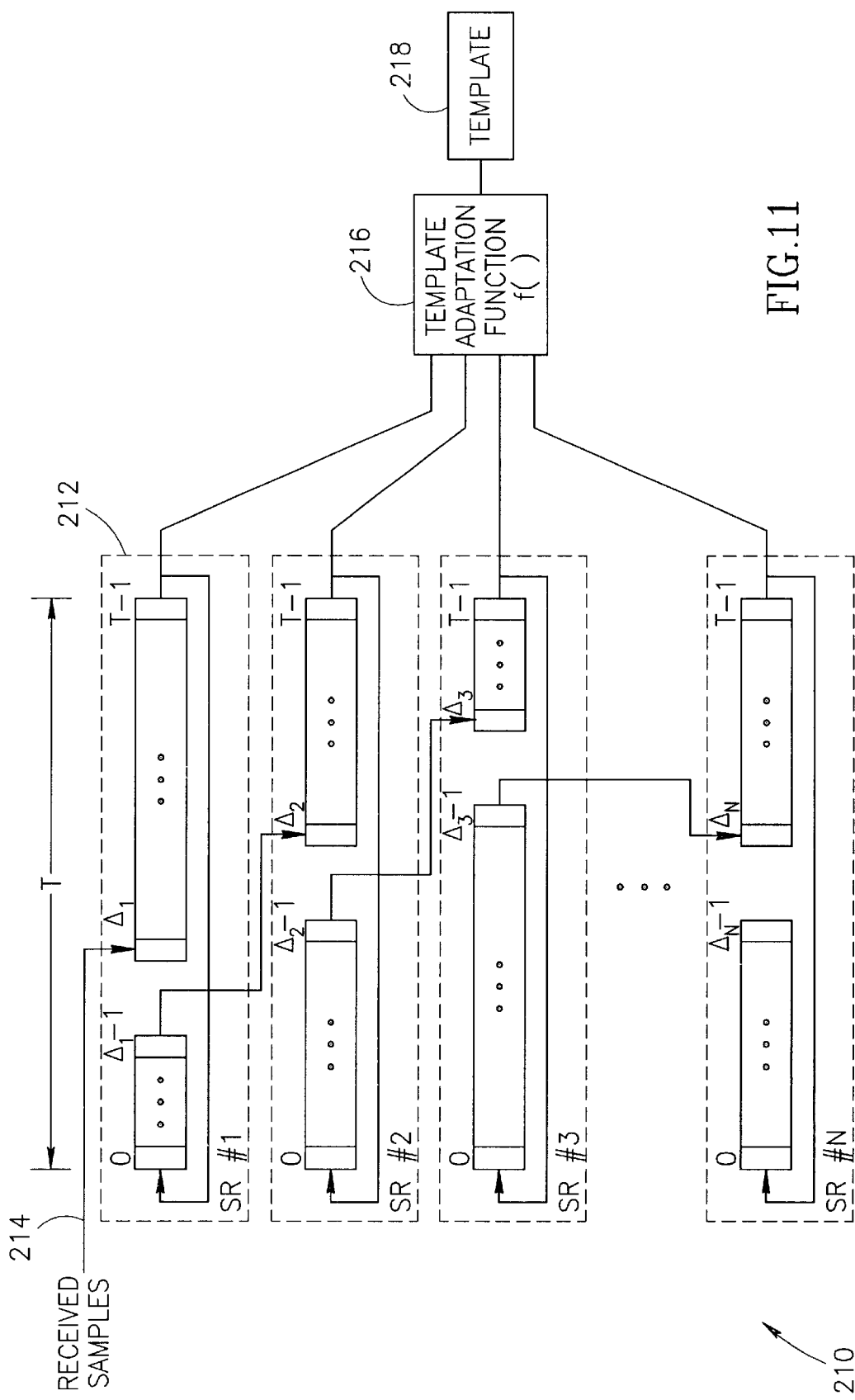
FIG. 11 is a diagram illustrating an alternative template initialization circuit constructed in accordance with the present invention.

A diagram illustrating an alternative template initialization circuit constructed in accordance with the present invention is shown in FIG. 11. The circuit, generally referenced 210, comprises a plurality N of shift registers 212 each having a total length T. The output of the T−1 bit of each shift register is input to a template adaptation functions $f(\ )$ 216. The function comprises an averaging function that averages over time the received samples. The output of the function is input to a template register 218.

The T−1 bit of each shift register is fed back to its serial input at the first bit position. Each shift register, however, is split along its path at a particular tap position. The output of the tap just prior to the split forms the input for the next shift register. For example, SR #1 is split at the $\Delta_1$ tap. The received data samples 214 are input to the first $\Delta_1$ tap position of SR #1. The $\Delta_1$−1 tap is fed to the input of the $\Delta_1$ tap of SR #2. Similarly, the output of the $\Delta_2$−1 tap forms the input to the $\Delta_3$ tap. This continues to the SR #N where the $\Delta_{N-1}$−1 of SR #N−1 forms the input to the $\Delta_N$ tap of SR #N.

In operation, the $\Delta$ tap position corresponds to the rotation of each symbol within the sequence used for purposes of template initialization. The tap positions are positioned such that the bits fed from the T−1 tap position to the template averaging function are stripped of any rotation.

After the receipt of all the symbols in the initialization sequence, the contents of the template 218 comprise the initial of the template used by the receiver. The template initialization synchronization apparatus can be adapted to handle sequences having any number of symbols N comprising any combination of zero shifted and non-zero shifted symbols.

Once all the shift registers are filled with the initialization sequence symbols, the template shift register begins to fill with the output of the template adaptation function. The point in time the template register begins to fill is determined by an external means of synchronization such as that described in U.S. application Ser. No. 09/415,723, filed on Oct. 12, 1999, entitled "Apparatus For And Method of Adaptive Synchronization In A Spread Spectrum Communications Receiver."

As described previously, during acquisition mode, the receiver synchronizes to the beginning of the received symbols and detects a synchronization sequence while learning the behavior of the channel. This mode was described in detail hereinabove. During tracking mode, the receiver tracks the symbols, decodes them and continually adjusts the template in accordance with the behavior of the channel. The operation of the receiver will now be described in more detail.

Code Shift Keying Receiver

Figure 12:
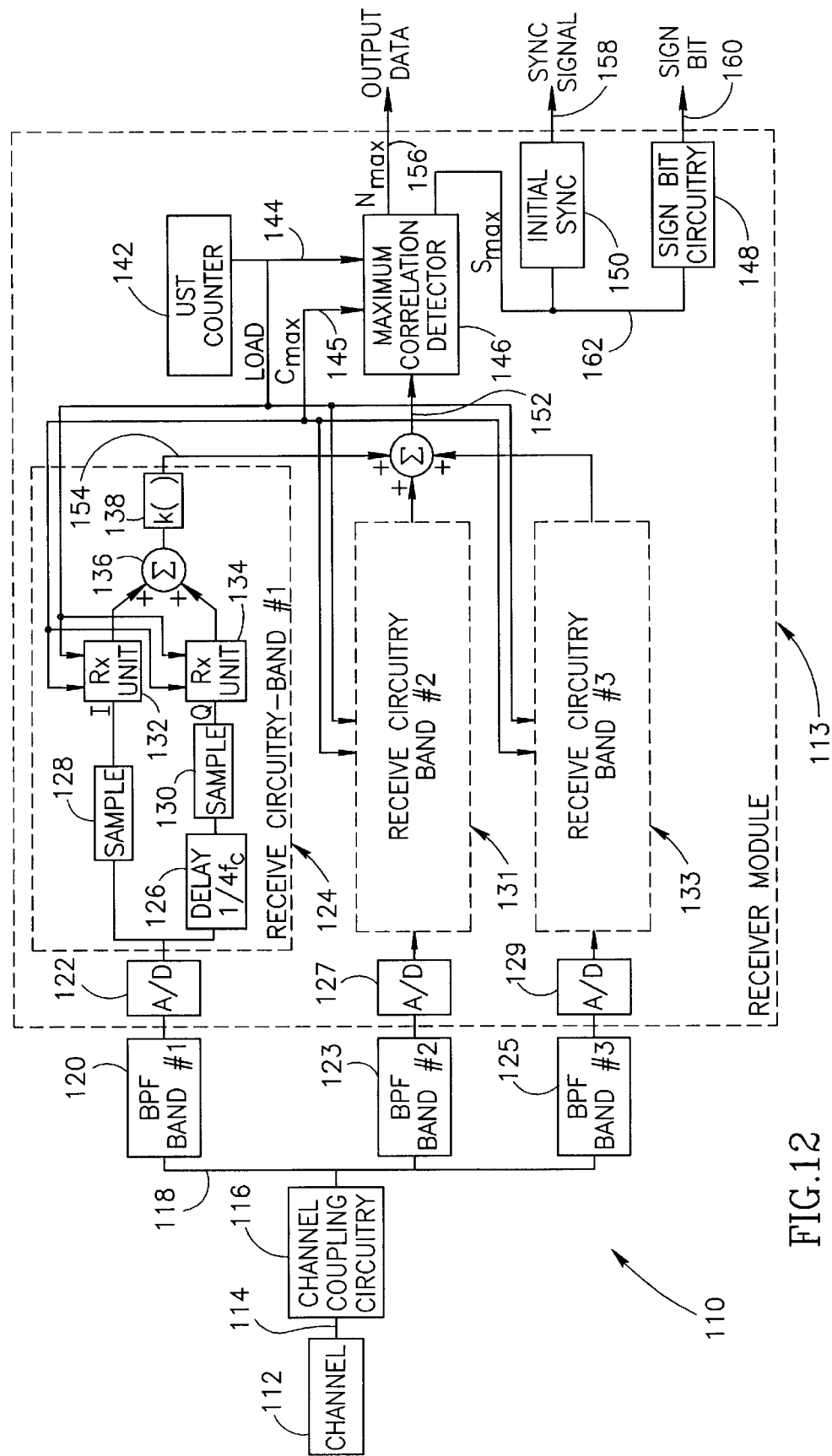
FIG. 12 is a block diagram illustrating a code shift keying receiver constructed in accordance with the present invention.

A block diagram illustrating a code shift keying receiver constructed in accordance with the present invention is shown in FIG. 12. To improve performance, the receiver of the present invention divides the reception band into a plurality of reception sub bands. In the example provided herein, the reception band is divided into three sub bands. It is appreciated, however, that one skilled in the art can construct a receiver having any number of sub bands without departing from the scope of the invention.

The receiver, generally referenced 110, is split into three pass bands. A separate receiver circuit 124 is provided for each of the sub bands. The three receiver circuits are labeled receive circuitry—band #1 through band #3. Preferably, the sub bands are equal in size but this is not a requirement. For a spreading waveform comprising a PN sequence that spans a frequency range of 4 to 20 MHz, the three frequency bands are: 4 to 9 MHz, 9 to 15 MHz and 15 to 20 MHz.

The signal 114 from the channel 112 is input to channel coupling circuitry 116 which functions as the analog front end for the receiver. The received signal (Rx IN) output of the channel coupling circuitry 116 is input to three band pass filters (BPF), labeled BPF band #1 through #3. Band pass filter #1 120 covers the frequency range of band #1 (4 to 9 MHz), band pass filter #2 123 covers the frequency range for band #2 (9 to 15 MHz) and band pass filter #3 125 covers the frequency range for band #3 (15 to 20 MHz). If, in an alternative embodiment, the spreading waveform comprises a chirp pattern ranging from 100 to 400 KHz, band #1 has a pass band from 100 to 200 KHz, band #2 from 200 to 300 KHz and band #3 from 300 to 400 KHz.

Alternative embodiments may use a different number of bands. Note that, preferably the number of bands is two or greater in order to achieve an increase in reliability. In the case of three bands, two of the bands can be corrupted with noise and fail to receive and the receiver logic of the remaining band may still be able to output correct data. In addition, the splitting of the received signal to three bands has the advantage of making the receiver more immune to phase distortions. The amount of distortion that each band can handle does not change but the contribution from all three bands working together increases the amount of phase distortion the receiver can handle and still receive properly.

The output of each band pass filter is input to a one bit A/D converter. In particular, the output of band pass filter #1 120 is input to A/D converter 122. The output of band pass filter #2 123 is input to A/D converter 127. Similarly, the output of band pass filter #3 125 is input to A/D converter 129. Note that the A/D converter may comprise an A/D of any suitable width. In the example presented herein, the A/D comprises a one bit A/D converter. The one bit A/D converter may comprise a comparator which compares the input signal with its average value followed by a sampler clocked at the appropriate sampling frequency. Note that the output of the A/D converter may comprise other bit lengths as well. The sampling rate $f_s$ in the example receiver presented herein is 16 MHz. The center frequency $f_\alpha$ for each of the bands #1, #2, #3 is 8, 12 and 16 MHz, respectively.

The binary output of each of the one bit A/D converters is input to a receive circuit. In particular, the output of A/D converter 122 is input to receive circuitry 124 for band #1. The output of A/D converter 127 is input to receive circuitry 131 for band #2. Similarly, the output of A/D converter 125 is input to receive circuitry 133 for band #3. The circuit and operation of the receive circuitry for each of the bands is identical. Therefore, only the receive circuitry for band #1 is shown in FIG. 12 for clarity sake. The description for receive circuitry of band #1 applies to the receive circuitry for bands #2 and #3 as well.

The output of the A/D converter 122 is sampled at the sampling frequency $f_s$ by sampler 128 forming an I data stream. The output of the A/D converter 122 is also sampled at the sampling frequency $f_s$ by sampler 130 after being delayed a period of $\frac{1}{4}f_c$ by delay circuit 126. The output of the sampler 130 forms a 90 degree quadrature Q bit stream.

Each of the I and Q data streams are input to a separate receiver unit. The I bit stream or in phase bit stream is input to receiver unit 132. The Q or out of phase bit stream is input to receiver unit 134. The I and Q data streams are correlated by receiver units. The output of the receiver unit 132 comprises the correlation results for the I data stream and the output of the receiver unit 134 comprises the correlation results for the Q data stream.

The output of the I and Q receiver units are summed by summer 136 before being processed by function block 138. This processing block applies a function k( ) to the data input to the block. Typically, the function comprises a nonlinear function adapted to apply emphasis to the low and high values of the data. A suitable nonlinear function may comprise $k(x) = \text{sign}(x) \cdot x^2$, for example.

The output 154 of the receive circuit for band #1 and the respective outputs for receive circuits for bands #2 and #3, 131, 133 are summed by summer 140 to yield a total correlation sum 152 for all the bands. This sum 152 is input to the maximum correlation detector 146. The maximum correlation detector 146 comprises three outputs: $N_{max}$, $S_{max}$ and $C_{max}$. The quantity $N_{max}$ is the output data 156 that indicates the shift index corresponding to the maximum correlation. The output data is decoded to yield the original transmitted data.

The maximum correlation detector also outputs the value $S_{max}$ 162 which represents the actual value of the correlation. During the acquisition mode only, the $S_{max}$ value is used by the initial synchronization circuit 150 to generate a synchronization signal 158 indicating that the acquisition mode is finished and tracking may begin. The magnitude of $S_{max}$ is used as an indicator of the quality of correlation, i.e., as a measure of the reliability of the reception.

In addition, the actual value of the correlation $S_{max}$, is used to extract an additional bit of information. The value $S_{max}$ is input to a sign bit circuit 148 adapted to generate a sign bit 160 in accordance with the sign of the correlation value. Note that in accordance with the present invention, the maximum correlation detector is optionally adapted to make available the correlation result generated at each relative rotation of the template and the receive symbol. The correlation results for each relative rotation may be used in other areas of the modem such as the error detection and correction circuit. The correlation results may also be made available at other points in the receiver such as at the output of each individual correlator.

The third output from the maximum correlation detector $C_{max}$ comprises a flag or a pulse adapted to indicate that a maximum correlation has been achieved.

All three outputs are generated for each symbol during the UST period. The maximum correlation detector has knowledge of the start and end of each symbol. The detector is adapted to receive a correlation sum for each sample time and to determine a maximum over all the samples making up a symbol during the UST period.

The UST counter 142 functions to count unit symbol time (UST) periods. Once each UST, the counter 142 is operative to generate a LOAD command used by the Rx units in generating a correlation sum.

Rx Unit—Tracking Mode

Figure 13:
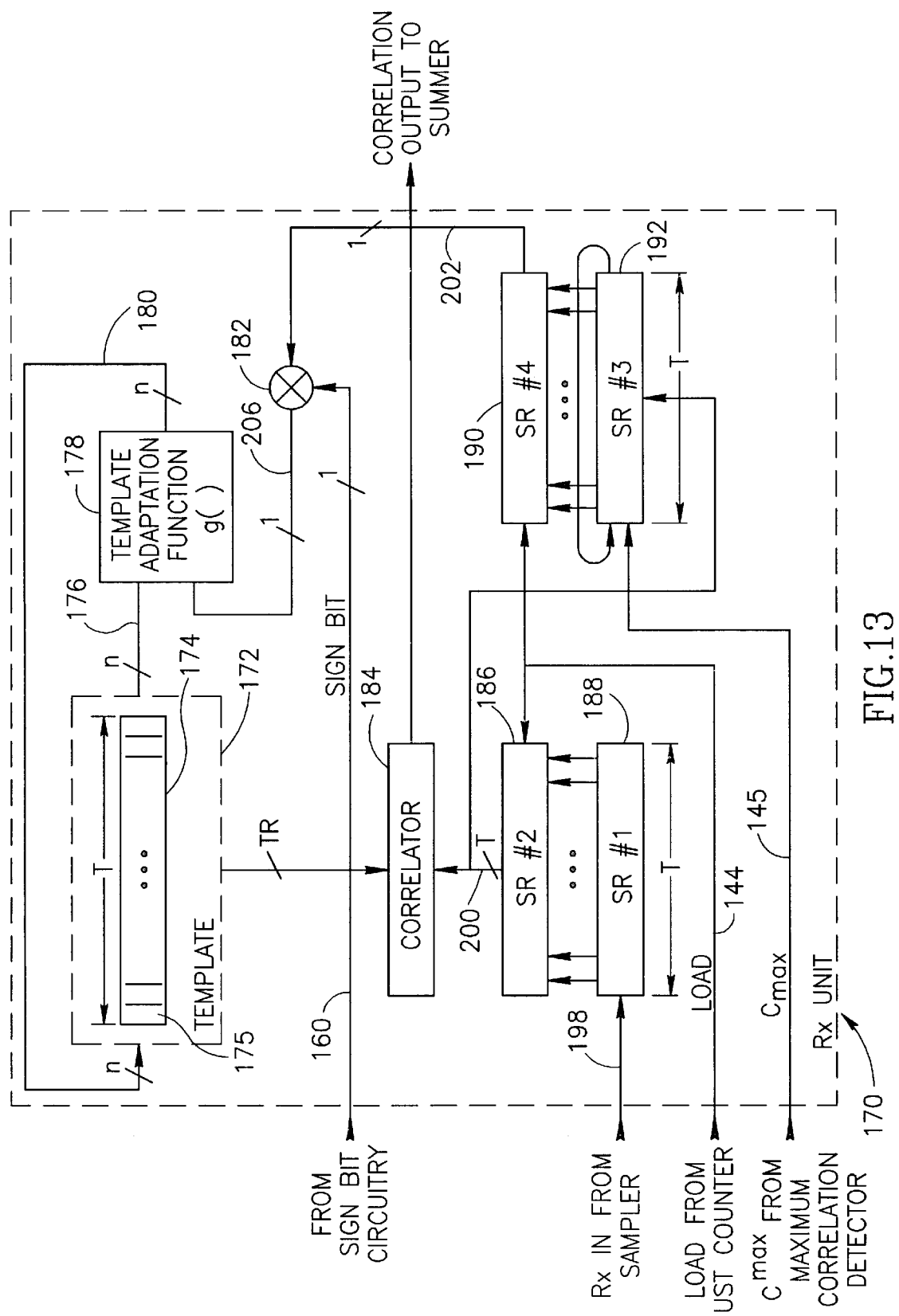
FIG. 13 is a block diagram illustrating the receiver unit of the code shift keying receiver of the present invention in more detail.

The receive unit portion of the receive circuitry will now be described in more detail. A block diagram illustrating the receiver unit of the code shift keying receiver of the present invention in more detail is shown in FIG. 13. The receive unit (Rx unit), generally referenced 170, comprises a correlator 184 adapted to correlate the received signal with a template.

The received signal (Rx IN) 198 from the sampler is clocked serially into shift register (SR) #1 188. Shift registers #1 188, #2 186, #3 192 and #4 190 are all T bits wide. Once SR #1 fills after one UST has been counted by the UST counter 142 (FIG. 12), the contents of SR #1 are parallel loaded into SR #2. The contents 200 of SR #2 are parallel loaded into the correlator 184 where they are correlated with the contents of the template 172. The correlator performs the correlation in accordance with the following.

$$Y = \sum_{k=0}^{T-1} X_k \cdot r_k \qquad (16)$$

where $X_k$ is the received symbol for k=0 to T−1, T is the number of samples in each received symbol (i.e., the symbol length which is also the number of taps of the shift registers SR #1, SR #2, SR #3 and SR#4), $r_k$ is the potentially rotated template (as distinguished from the unrotated template 't' defined above) and Y is the correlation output 204. Note that the symbol T used to denote the number of samples per symbol in the transmitter, acquisition circuit and the template learning and tracking circuit may represent different values, i.e. different sampling frequencies, and are not necessarily related to one another. Note that a separate correlation is performed for both I and Q values. For the I data stream $X_k$ represents the real part of the received symbol. For the Q data stream $X_k$ represents the imaginary part of the received symbol.

In the example embodiment presented herein, the received symbol is stationary and the template is rotated to generate a correlation sum for each sample. Alternatively, the template can be fixed and the received symbol is rotated to achieve the same results.

The template 172 comprises a shift register 174 wherein each tap 175 comprises 'n' bits where the value of 'n' is any positive integer (i.e., greater than or equal to one). The length of the template corresponds to the length T of the symbol. Thus, the template comprises T taps, each tap consisting of 'n' bits. The value of 'n' may be set in accordance with the desired resolution. In this example, the length T of the template is 64 and the number of bits 'n' per tap is 5. Thus, the template comprises a total of Tn bits.

If the template is initialized from the synchronization acquisition circuitry described in FIG. 7, the two most significant bits (MSBs) of the five bits of the template 23 are initialized with the acquisition template contents. The remaining three bits of each tap are initialized to zero.

The Rx unit 170 is adapted to output TR bits from the template 172 to the correlator 184, wherein R is any positive integer. In accordance with the invention, not all 'n' bits representing each tap in the template are output to the correlator. The number of bits per tap 'R' output to the correlator may be lower than 'n'. The value of 'R' may be lower in order to decrease the complexity of the Rx unit. For example, the two most significant bits per tap (i.e., R=2) may be correlated with the corresponding single bit per tap of SR #2, in order to reduce the complexity of the circuitry.

The output of the correlator 184 for both the I and Q data streams are input to the summer 136 (FIG. 12). A function k( ) 138 is applied to the sum and the output 154 is input to summer 140. The function k( ) can be expressed as $$k(x) = \text{sign}(x) \cdot x^2 \qquad (17)$$

The summer 140 functions to sum the outputs 154 of the receive circuitry 124 for each of the frequency bands. The output of the summer 140 is input to the maximum correlation detector 146.

At each UST period, the UST counter 142 generates a LOAD signal 144 that is input to the load input of SR #2 and SR #4. In response to the LOAD signal, the contents of SR #1 are parallel loaded into SR #2. The contents of SR #2 are correlated with all possible rotations of the template during the next UST. When the maximum correlation detector 146 detects a maximum correlation at its input, it generates the $C_{max}$ signal 145 that comprises a pulse adapted to indicate a maximum correlation.

The $C_{max}$ signal is input to SR #3 whose serial output is configured to be fed back to its serial input. The $C_{max}$ signal is used to parallel load the output of SR #2 into SR #3. The last $C_{max}$ pulse to arrive in the current UST is the true maximum within this UST. It occurs after the template has been rotated by j rotations where j is the amount of rotation originally applied by the transmitter to this particular symbol. Subsequently, SR #3 is rotated T−j times which is the number of rotations remaining until the end of the UST. At the end of the UST, the rotation originally applied to the symbol in SR #3 will have been removed. Thus, the symbol which was rotated 'j' times by the transmitter and then T−j times in SR #3 will eventually be de-rotated by the time it is copied to SR #4.

In response to the LOAD signal from the UST counter, the contents of SR #3 are parallel loaded into SR#4. The symbol loaded into SR #4 comprises the newly received symbol stripped out of any rotation. The contents of SR #4 are serially shifted out via output signal 202 and input to multiplier 182. The second input to the multiplier comprises the sign bit 160 generated by the sign bit circuitry 148. The serial symbol data is multiplied by the sign bit in order to remove any phase reversal from the symbol before being processed by the template adaptation function 178.

The phase removed serial symbol stream 206 is input to the template adaptation function 178. The contents of the template 172 are serially shifted and at each sample clock, the 'n' bits of a tap are clocked into the template adaptation function along with the bit 206 from the currently received symbol. In this example, each tap 175 of the template comprises 5 bits, therefore for each sample clock, 5 bits of the template are clocked into the template adaptation function.

The function g( ) is adapted to input the 'n' bits of the template and the bits of the received symbols to yield an 'n' bit result 180. The function g( ) averages the bits of the received symbols with the current contents of the template and feeds the results back to the input of the template where they are serially clocked in at each sample time. In this fashion, the template is continuously being updated in accordance with the received symbols. Since the template is being rotated, during each sample time a different sample is updated.

In particular, the function g( ) may comprise any suitable averaging function such as shown below in an expression for the updated template data.

$$g(t_k^{i-1}, X_k) = k_1 t_k^{i-1} + k_2 X_k \qquad (18)$$

where $t_k^{i-1}$ is the $k^{th}$ tap of the template at time index i−1;

$X_k$ is the $k^{th}$ tap of the de-rotated and phase shift reversed symbol;

$k_1$ and $k_2$ are constants.

The adaptation of the template can be described mathematically as $$t_k^i = \begin{cases} g(t_k^{i-1}, X_k) & k = i \bmod T \\ t_k^{i-1} & \text{otherwise} \end{cases} \qquad (19)$$

The mathematical relation expressed in Equation 19 indicates that only one sample of the template is updated for each upcoming update bit. The samples remaining in the template at that point in time remain unchanged where $t_k^i$ represents the new value of the $k^{th}$ template tap at time index i, $t_k^{i-1}$ represents the previous value of the $k^{th}$ template tap, $k_1$ and $k_2$ are constants and i is the tap index (note that k ranges from 0 to 63 in this example).

This example function for g( ) can be considered an autoregressive function since the function is updated in accordance with past data. The function g( ) represents a weighted average wherein more or less weight may be given to the previous template tap and the received symbol. The previous template tap is multiplied by a constant $k_1$. For example $k_1=0.95$ which would give less weight to the previous template. A value of $k_1$ other than 0.95 may be used depending on how much weight is to be given the previous template. The value of the constant $k_2$ can be selected so as to provide appropriate scaling to the template. In addition, it is preferable to apply limiting to the output of g( ) before the result is input to the template so as to avoid overflows.

Note that if a one bit A/D is used, the I and Q data values for the computations described above can be represented as either +1 or −1 which in digital binary form may be represented by a single bit, i.e., 0 or 1.

Figure 14:
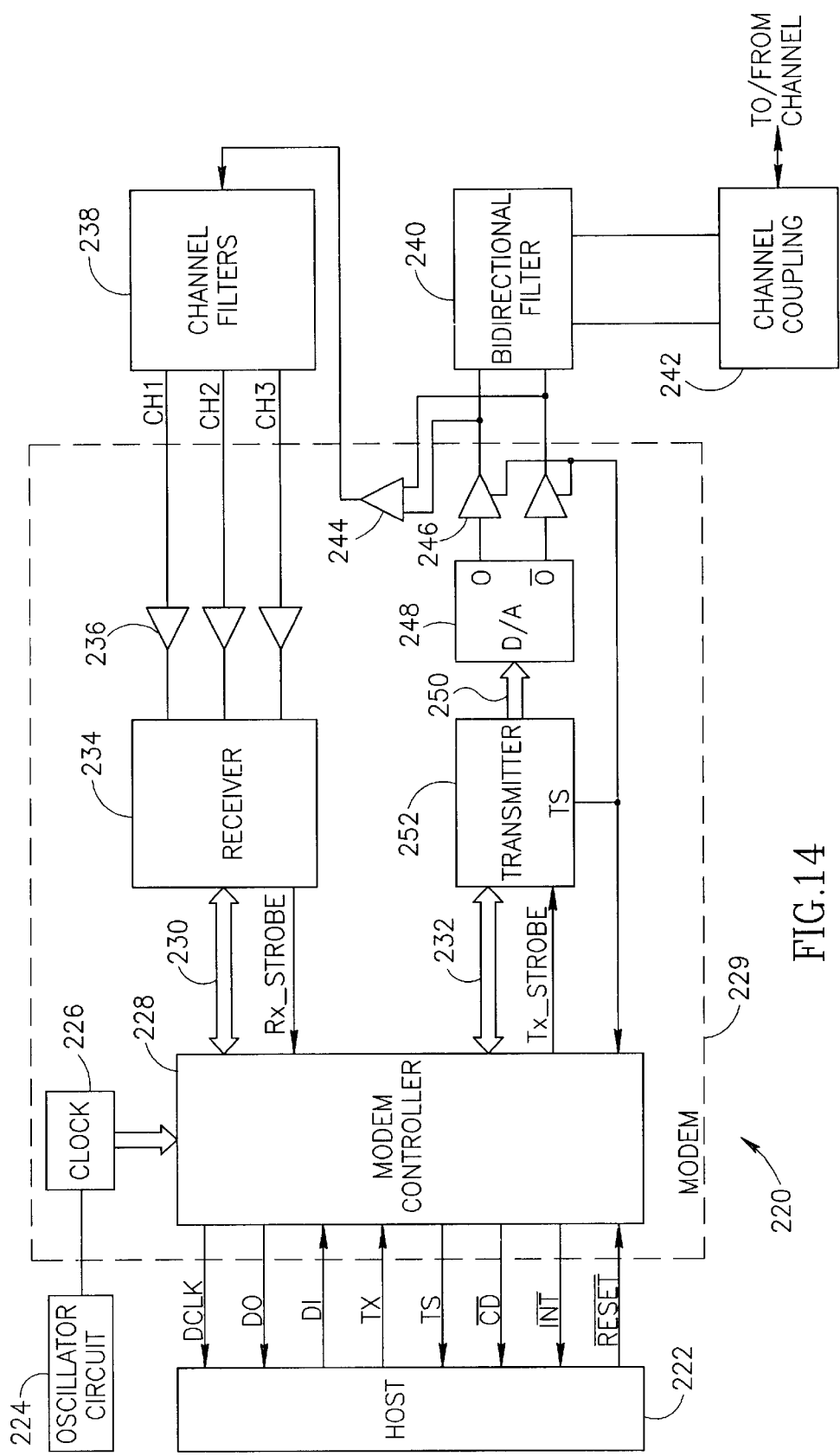
FIG. 14 is a block diagram illustrating the application of the receiver of the present invention in an example bi-directional modem.

A block diagram illustrating the application of the receiver of the present invention in an example bi-directional modem is shown in FIG. 14. The system, generally referenced 220, comprises a host 222, modem 229, oscillator circuit 226, channel filters 238, bi-directional filter 240 and channel coupling circuit 242. The host 222 is responsible for providing the data information to be transmitted in addition to the control information for configuring and controlling the modem. The host communicates with the modem via a plurality of signal lines comprising clock, data and control signals. The host comprises processing means suitably programmed to transmit data and control packets to the modem and to receive and process data and status information received from the modem.

The modem is coupled between the channel via channel coupling circuitry 242 and the host via a Modem Controller 228. The modem provides bi-directional half duplex communications suitable for use with a variety of media such as the AC power line and twisted pair cable. The modem comprises a Modem Controller 228, transmitter portion 252, receiver portion 234, D/A converter 248, tri-state gate amplifiers 246, amplifiers 236 and preamplifier 244.

The host provides the data, control and configuration information via a Serial Peripheral Interface (SPI) within the modem controller. The modem controller processes the information received from the host and outputs data packets to the transmitter for transmission over the channel. The transmitter portion is adapted to transmit packets of data output by the modem controller. The data is transferred via signal lines 232 and is clocked in via a Tx strobe. The output of the transmitter is input to the D/A converter via signal bus 250. The D/A converter functions to convert the digital output of the transmitter to an analog signal represented by a Q and inverted Q output. These two outputs are buffered by gated power amplifiers before being output to the filter. The output amplifiers 246 are gated by the tri-state control signal TS generated by the transmitter and available to the host via the modem controller.

The filter is optionally constructed as a bidirectional filter, able to perform filtering in both signal directions. The filter is used to filter unwanted signal components from the received signal, since the spectrum of the transmit signal contains spurious signals and harmonics. The output of the filter is input to a channel coupling circuit for coupling the signal to the channel. The filter comprises passive components which function to condition the signal for placement over the particular channel, e.g., power line carrier, twisted pair cable, etc.

In the receive direction, the filter 240 is used to filter out of band noise and interference from the signal output from the channel coupling circuit 242. The use of the same filter for both transmit and receive reduces the number of components, cost and complexity of the system. The output of the filter is amplified by preamplifier 244 before being input to a plurality of channel filters 238. In this example, a bank of three filters is used to cover the desired frequency band and to generate three receive signals labeled CH1, CH2, CH3. The outputs of the channel filters are input to buffers 236 before being input to the receiver.

The receiver 234, adapted to receive packets input from the channel, comprises a receiver constructed in accordance with the present invention such as the receive module 113 of FIG. 12. In one example embodiment, packet reception functions performed by the receiver include synchronization to init sequence, header parsing and demodulation of the data. The header is configured to comprise the data rate, packet type and packet length. The modem controller checks the validity of the header using $CRC_8$ and the validity of the data payload using $CRC_{16}$. Each packet is prefixed by the host with two or more bytes that configure the transmission of packets. Examples of parameters that can be configured include packet type, data rate, power level, wait time and the collision detection preamble. For received packets, the receiver functions to detect the data rate and to inform the host of the data rate detected. The output of the receiver is input to the modem controller via signal bus 230 and an Rx strobe. The interface between the modem controller (via the SPI) and the host comprises a plurality of data, control and clock signals. The signal names and associated descriptions are summarized in Table 1 below.

TABLE 1

| Interface Between SPI and Host Computer | |
|---|---|
| Signal | Description |
| DCLK | SPI data clock output to the host |
| DO | SPI data output to the host |
| DI | SPI data input from the host |
| TX | Host request to send wherein a rising edge indicates a packet transmission request |
| TS | Output amplifier tristate control indicating that the modem is transmitting on the channel |
| CD* | Carrier Detect/Collision Detect (active low when SOP synchronization sequence or preamble (if transmitted) detected) |
| INT* | Interrupt output to the host |
| RESET* | Reset signal to reset the modem (active low) |

The behavior and operation of the signals used in communicating between the host and the modem controller are described in more detail in U.S. application Ser. No. 09/504,054, filed on Feb. 14, 2000, entitled "Host to Modem Interface," similarly assigned and incorporated herein by reference in its entirety. Note that the serial interface described above is presented as an illustrative example. It is not intended that the present invention be limited to use of the serial interface presented above. One skilled in the electrical arts can implement communications between the host and the modem using any suitable mechanism, e.g., serial, parallel, memory mapped, etc.

Figure 15:
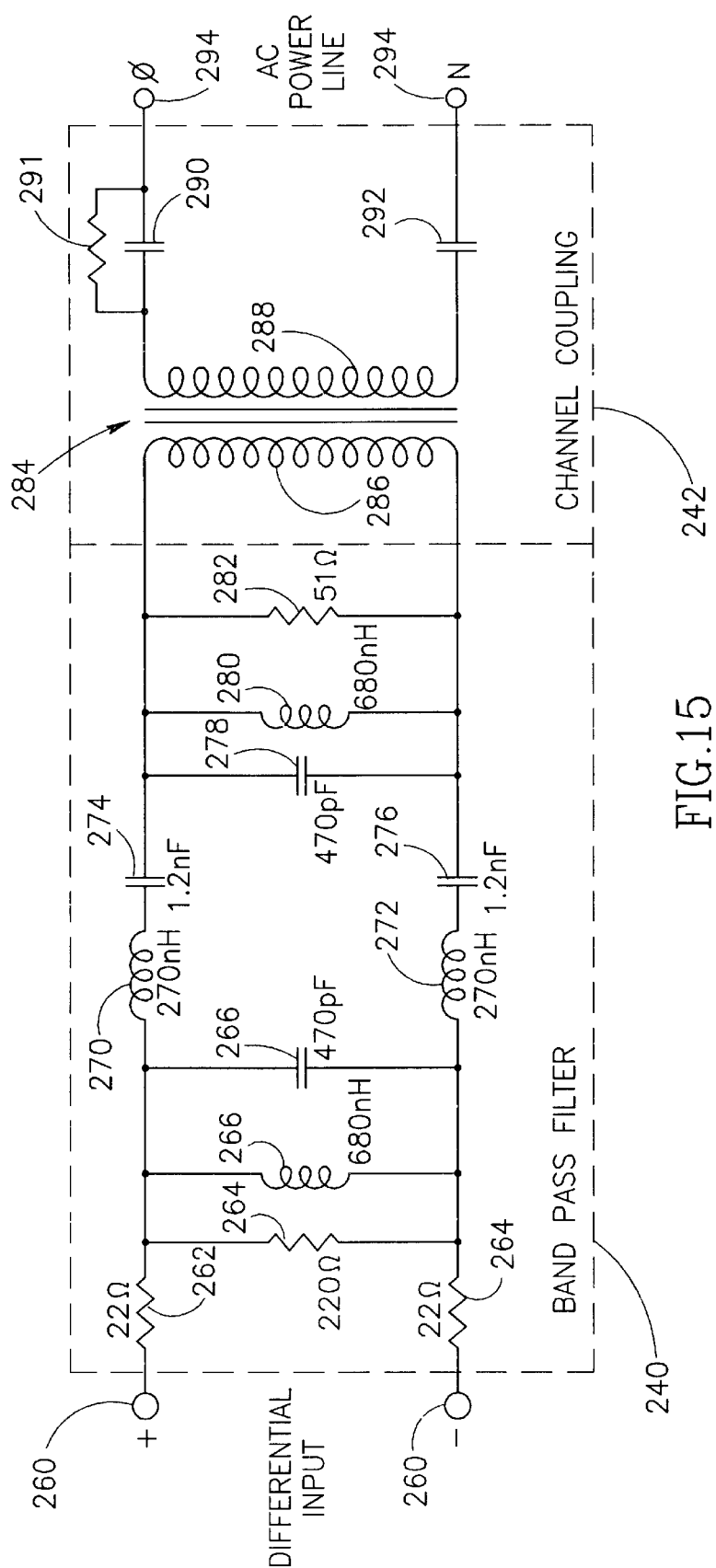
FIG. 15 is a schematic diagram of the bi-directional filter used in the modem of FIG. 14.

A schematic diagram of the bidirectional filter used in the modem of FIG. 14 is shown in FIG. 15. The bidirectional filter 240 comprises two RLC tank circuit coupled by two series LC circuits. In operation, the differential output of the channel drive amplifier is input to a band pass filter in order to generate the desired spectrum. In the examples presented herein, the BPF is an analog band pass filter preferably constructed as a symmetrical filter. The pass band of the filter is approximately 4 to 20 MHz. Although asymmetrical (unidirectional) filters are easier to design and construct, a symmetrical filter is preferable in the case when the filter is used in the transmit path and the receive path.

The differential input signal is applied to the plus and minus terminals 260 and is fed to a first RLC tank circuit via series resisters 262, 264. The first RLC circuit comprises a resister 264, inductor 266 and capacitor 268. A second RLC circuit comprises resister 278, inductor 280 and capacitor 282. The first and second RLC circuits are coupled via series LC circuits comprising inductor 270/capacitor 274 and inductor 272/capacitor 276. The component values of a band pass filter suitable for use with the present invention are as shown in FIG. 15.

The output of the band pass filter is input to the channel coupling circuit 242. The coupling circuitry comprises a signal transformer 284 consisting of a primary winding 288 and a secondary winding 286. The primary winding is coupled to series capacitors 290, 292 which function as a bidirectional symmetric high pass filter for coupling the transmitter to the AC power line via phase and neutral terminals 294. Resister 291 in parallel with capacitor 290 functions to discharge capacitor 90 when the device is removed from the AC power line.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A receiver for use in a code shift keying spread spectrum communication system comprising:
    a front end circuit coupled to a channel and adapted to filter a receive input signal into N streams, each receive sample stream associated with one of said frequency bands;
    N receiver circuits coupled to said front end circuit, each receiver circuit associated with a frequency band, each receiver circuit comprising:
        a template comprising a plurality of taps;
        initialization means operative to generate an initial value for said template from a plurality of training symbols stripped of rotation and phase whereby said template is initialized to said channel;
        means for generating receive symbols from a corresponding one of said receive sample streams;
        a correlator adapted to correlate the contents of said template with said received symbols, said correlator operative to generate a correlation sum for each relative rotation between said templated and said received symbols, for all possible transmitted rotations of a symbol;
    a combiner for combining the correlation sums generated by said N receiver circuits so as to yield a total correlation value;
    a maximum correlator detector operative to determine a shift index corresponding to a maximum total correlation value over all rotations of said template, said shift index subsequently decoded to yield receive data; and
    wherein N is a positive integer.

2. The receiver according to claim 1, wherein said initialization means is adapted to initialize said template using an average of said plurality of training symbols stripped of rotation and phase.

3. The receiver according to claim 1, further comprising means for adapting said template subsequent to initialization by said plurality of training symbols utilizing a plurality of received symbols stripped of rotation and phase.

4. The receiver according to claim 1, wherein said front end circuit comprises N band pass filters adapted to filter said receive input signal into N frequency bands, each band pass filter having a center frequency $f_c$.

5. The receiver according to claim 1, wherein said plurality of training symbols used for initialization of said template is also used for acquisition of a receive sample stream within each receiver circuit.

6. The receiver according to claim 1, wherein said template is used during a process of the acquisition, the results of which are stored and used as a template subsequently during data reception.

7. The receiver according to claim 1, wherein said front end circuit comprises N analog to digital converters, each analog to digital converter adapted to generate a receive sample stream for a particular frequency band.

8. The receiver according to claim 7 wherein said analog to digital converter comprises a one bit analog to digital converter.

9. The receiver according to claim 8, wherein said one bit analog to digital converter utilizes a comparator against the average voltage of said received signal.

10. The receiver according to claim 1, wherein said means for generating received symbols comprises means for generating I and Q symbols from a corresponding one of said receive sample streams.

11. The receiver according to claim 10, wherein said means for generating I and Q symbols comprises delay means adapted to delay a corresponding one of said receive sample streams by $\frac{1}{4}f_c$ yielding said Q symbols.

12. The receiver according to claim 1, wherein said means for generating received symbols comprises means for generating real symbols from a corresponding one of said receive sample streams.

13. The receiver according to claim 1, wherein said template is adapted to be rotatable and said received symbols are adapted to be rotated.

14. The receiver according to claim 1, wherein said template is adapted to be fixed and said received symbols are adapted to be rotated.

15. The receiver according to claim 1, wherein said front end comprises analog channel coupling circuitry adapted to interface said receiver to said channel and to output said receive signal therefrom.

16. The receiver according to claim 1, wherein said means for generating received symbols comprises:
    a first sampler adapted to create a binary representation of a corresponding one of said N receive sample streams so as to yield an I received symbol stream;
    delay means adapted to delay a corresponding one of said N received sample streams by $\frac{1}{4}f_c$, wherein $f_c$ is the center frequency of the associated frequency band; and
    a second sampler adapted to create a binary representation of the output of said delay means so as to yield a Q receive symbol stream.

17. The receiver according to claim 1, wherein said template comprises a plurality of taps, each tap comprising one or more bits.

18. The receiver according to claim 1, wherein said correlator is adapted to receive a number of bits R per tap from said template, wherein R is independent of the number of bits per tap stored in said template.

19. The receiver according to claim 1, further comprising a function module operative to apply a function adapted to emphasize low and high values of said correlation sums.

20. The receiver according to claim 19, wherein said function module comprises means for applying the function $k(x)=\text{sign}(x) \cdot x^2$, wherein x represents said correlation sums.

21. The receiver according claim 1, further comprising sign bit circuitry for detecting the phase of the received symbols and outputting a receive data bit therefrom.

22. The receiver according to claim 1, further comprising means for detecting a carrier phase of the received symbols and extracting n bits therefrom.

23. The receiver according to claim 1, wherein N equals three.

24. The receiver according to claim 1, wherein N equals three and the corresponding three frequency bands are 4 to 9 MHz and 9 to 15 MHz and 15 to 20 MHz, with center frequencies of 8, 12 and 16 MHz, respectively.

25. The receiver according claim 1, further comprising a template adaptation module operative to modify said template utilizing the current contents of said template and said received symbols so as to dynamically adjust said template to said channel.

26. The receiver according to claim 25, wherein said template adaptation module comprises means for applying an averaging function to said template and said received symbols.

27. The receiver according to claim 26, wherein said averaging function comprises $$g(t_k^{i-1}, X_k) = k_1 t_k^{i-1} + k_2 X_k$$

where $t_k^{i-1}$ represents the previous value of the $k^{th}$ template tap;

$X_k$ represents the bit of the received symbol with all rotation and phase modulation stripped therefrom;

$k_1$ and $k_2$ are constants;

k is the tap index;

and the result of this function is used to update $t_k^i$ which is the new value of the $k^{th}$ template tap.

28. The receiver according claim 1, wherein said initialization means comprises means for applying and averaging function to said template and said received symbols.

29. The receiver according to claim 28, wherein said averaging function comprises $$g(t_k^{i-1}, X_k) = k_1 t_k^{i-1} + k_2 X_k$$

where $t_k^{i-1}$ is the $k^{th}$ tap of the template at time index i−1;

$X_k$ is the $k^{th}$ tap of the de-rotated and phase shift reversed symbol; and $k_1$ and $k_2$ are constants.

30. The receiver according to claim 1, wherein said front end circuit comprises a bi-directional filter adapted to filter said receive signal.

31. The receiver according to claim 1, wherein said front end circuit comprises:

a bi-directional filter adapted to filter said receive signal; and a preamplifier adapted to amplify the signal output of said bi-directional filter before said signal is divided into multiple frequency bands.

32. The receiver according to claim 1, further comprising means for providing the correlation results of each relative rotation of said template and said received symbols.

33. In a code shift keying spread spectrum communications system, a method of receiving, said method comprising the steps of:

filtering an input signal received from a channel into N frequency bands and generating N receive sample streams therefrom, each receive sample stream associated with one of said frequency bands;

for each frequency band:

providing a template comprising a plurality of taps;

generating an initial value for said template from a first plurality of de-rotate and phase stripped training symbols thereby adapting said template to said channel;

synchronizing a symbol clock in response to a second plurality of training symbols;

generating receive symbols from a corresponding one of said receive sample streams in accordance with said symbol clock;

correlating the contents of said template with said received symbols so as to generate a correlation sum for each relative rotation between said template and said received symbols, for all possible transmitted rotations of a symbol;

combining the N correlation sums so as to yield a total correlation sum;

determining a shift index corresponding to a maximum total correlation sum over all rotations of said template;

decoding said shift index to yield receive data; and wherein N is a positive integer.

34. The method according to claim 33, further comprising modifying said template utilizing the current contents of said template and said received symbol so as to enable said template to dynamically adjust said template to changes in said channel.

35. The method according to claim 33, wherein said step of generating receive symbols comprises the steps of:

sampling a corresponding one of said N receive sample streams so as to yield an I receive symbol stream;

delaying a corresponding one of said N receive sample streams by $\frac{1}{4}f_c$ to generate a delayed signal, wherein $f_c$ is the center frequency of the associated frequency band; and sampling said delayed signal so as to yield a Q receive symbol stream.

36. The method according to claim 33, wherein said template comprises a plurality of taps, each tap comprising one or more bits.

37. The method according to claim 33, further comprising the step of modifying said template utilizing the current contents of said template and said received symbols so as to dynamically adjust said template to said channel.

38. The method according to claim 37, wherein said step of modifying said template comprises applying an averaging function to said template and said received symbols.

39. The method according to claim 38, wherein said averaging functions comprises $$g(t_k^{i-1}, X_k) = k_1 t_k^{i-1} + k_2 X_k$$

where $t_k^{i-1}$ is the $k^{th}$ tap of the template at time index i−1;

$X_k$ is the $k^{th}$ tap of the de-rotated and phase shift reversed symbol; and $k_1$ and $k_2$ are constants.

40. The method according to claim 33, wherein said step of correlating comprises receiving a number of bits R per tap from said template, wherein R is independent of the number of bits per tap stored in said template.

41. The method according to claim 33, further comprising the step of applying a function adapted to emphasize low and high values of said correlation sum.

42. The method according to claim 41, wherein said function comprises $k(x)=sign(x) \cdot x^2$, wherein x represents said correlation sums.

43. The method according to claim 33, further comprising the step of detecting the phase of the received symbols and outputting a receive data bit therefrom.

44. The method according to claim 33, wherein N equals three.

45. The method according to claim 33, wherein N equals three and the corresponding three frequency bands are 4 to 9 MHz, 9 to 15 MHz and 15 to 20 MHz, with center frequency of 8, 12 and 16 MHz, respectively.

46. The method according to claim 33, wherein said template is adapted to be rotatable and said received symbols are adapted to be fixed.

47. The method according to claim 33, wherein said template is adapted to be fixed and said received symbols are adapted to be rotated.

48. A code shift keying spread spectrum communication transceiver, comprising:

a transmitter adapted to generate symbols for transmission over a channel, said symbols comprising a spreading waveform circularly shifted in accordance with the data to be conveyed by said symbol; and a receiver, comprising:

a front end circuit coupled to said channel and adapted to filter a receive input signal into N frequency bands, said front end circuit operative to generate N receive sample streams, each receive sample stream associated with one of said frequency bands;

N receiver circuits coupled to said front end circuit, each receiver circuit associated with a frequency band, each receiver circuit comprising:

a template comprising a plurality of taps;

acquisition means operative to generate an initial value for said template from a plurality of training symbols that have been stripped of rotation and phase whereby said template is adapted to said channel;

means for generating receive symbols from a corresponding one of said receive sample streams;

a correlator adapted to correlate the contents of said template with said receive symbols, said correlator operative to generate a correlation sum for each relative rotation between said template and said received symbols, for all possible transmitted rotations of a symbol;

a combiner for combining the correlation sums generated by said N receiver circuits so as to yield a total correlation sum;

a maximum correlator detector operative to determine a shift index corresponding to a maximum total correlation sum over all rotations of said template, said shift index subsequently decoded to yield receive data; and wherein N is a positive integer.

49. The transceiver according to claim 48, wherein said spreading waveform comprises a chirp waveform.

50. The transceiver according to claim 48, wherein said transmitter is operative to use linear shifts.

51. The transceiver according to claim 48, wherein said transmitter is operative to use circular shifts.

52. The transceiver according to claim 48, wherein said receiver is operative to use linear shifts.

53. The transceiver according to claim 48, wherein said receiver is operative to use circular shifts.

54. The transceiver according to claim 48, wherein said spreading waveform comprises a PN sequence.

55. The transceiver according to claim 48, further comprising a serial peripheral interface for communicating data and control information between a host and said transceiver.

56. The transceiver according to claim 48, further comprising a bi-directional filter adapted to band pass filter a receive signal during reception and to filter a transmit signal during transmission.

57. The transceiver according to claim 48, further comprising means for providing the correlation results of each relative rotation of said template and said received symbols.

\* \* \* \* \*